United States Patent [19]

Takahashi et al.

[11] Patent Number: 4,852,984
[45] Date of Patent: Aug. 1, 1989

[54] TELEPHOTO LENS OF LARGE APERTURE RATIO

[75] Inventors: Sadatoshi Takahashi; Hideki Ogawa, both of Tokyo; Hiroshi Endo, Kanagawa, all of Japan

[73] Assignee: Canon Kabushiki Kaisha, Tokyo, Japan

[21] Appl. No.: 159,957

[22] Filed: Feb. 24, 1988

[30] Foreign Application Priority Data

| Feb. 25, 1987 | [JP] | Japan | 62-042410 |
| Oct. 15, 1987 | [JP] | Japan | 62-260854 |
| Dec. 11, 1987 | [JP] | Japan | 62-313900 |
| Dec. 11, 1987 | [JP] | Japan | 62-313901 |

[51] Int. Cl.$^4$ .......................... G02B 13/02; G02B 9/64
[52] U.S. Cl. ..................................... 350/454; 350/450
[58] Field of Search ................................ 350/454, 450

[56] References Cited

U.S. PATENT DOCUMENTS 4,732,459  3/1988  Hayashi ............................. 350/454

Primary Examiner—Bruce Y. Arnold
Assistant Examiner—Rebecca D. Gass
Attorney, Agent, or Firm—Fitzpatrick, Cella, Harper & Scinto

[57] ABSTRACT

A telephoto lens comprising, from front to rear, a first lens unit including a lens of negative power with its rear surface concave toward the rear and whose overall power is positive, a second lens unit of negative power axially movable for focusing, and a third lens unit of positive overall refractive power having a negative lens whose front-most lens surface is concave toward the front and at least two positive lenses.

21 Claims, 16 Drawing Sheets

TELEPHOTO LENS OF LARGE APERTURE RATIO

BACKGROUND OF THE INVENTION

1. Field of the Invention:

This invention relates to telephoto lenses of increased aperture ratio suited to photographic cameras or video cameras and, more particularly, to high-aperture telephoto lenses well corrected for high grade performance.

2. Description of the Related Art:

In outdoor or sports photography, because the subject is very often shot from a long distance with a fast shutter speed, very high demands have been made on the combination of long focal length and large aperture ratio in the taking lens.

In general, the bulk and size of the telephoto lens increases at a proportional rate to the increase in the focal length. For this reason, if the focusing method of moving the entire system as a whole is employed in a telephoto lens of increased focal length, not only is its total focusing movement increased, but also, the stress on the operating mechanism is rapidly increased. Hence there has been a drawback that quick and easy focusing becomes very difficult to perform. Also, because the lens system to be driven is very heavy, the perfection of centering is liable to break, thus giving rise to a serious problem that the image quality drops.

To avoid these problems, another focusing method by moving the lens system in part, or a rear one of the lens units, or the so-called rear-focus method, may be employed. In fact, a wide variety of forms of the rear-focus telephoto lens have been proposed.

There are superior advantages that use of the rear-focus method provides compared to the whole body-focus method. For example because the lens unit to be used has a relatively strong refractive power and is small and light, the total focusing movement is short, leaving room for shortening the minimum object distance. Moreover, focusing becomes easier and quicker. For example, Japanese Laid-Open Patent Application No. Sho 52-55639 discloses a technique of making focusing provision in one lens unit of the photographic objective.

In this document, however, the maximum aperture is as small as 5.6 in F-number. If the lens speed is increased to 2.0 or more in F-number with the use of the rear-focus method, on the other hand, the range of variation of aberrations with focusing is, in many cases, markedly increased.

Particularly spherical aberration in the terms of not lower than 5th order varies remarkably. As the object distance approaches the minimum, the spherical aberrations are largely under-corrected, worsening the image quality, and coma also starts to increase. To reduce the variation of these aberrations, one way is to design the preceding lens unit by using at least three positive lenses and two negative lenses. That is, passing through such a preceding lens unit, the light beam is made to smoothly coverage so that lesser aberrations of higher orders are produced. As a result, it becomes possible to afford some improvement of the stabilization of the aberration correction of the following or focusing lens unit throughout.

However, this technique cannot assist in the stabilization of the annular spherical aberration and coma, although the higher order spherical aberrations are maintained stable at an acceptable level. To solve this problem, it is advantageous to adopt one of the following measures.

(i) The floating technique is applied to the focusing lens unit;

(ii) The design of the focusing lens unit is revised so that the aberrations it produces are suppressed in itself to a minimum; and (iii) The design of the lens unit that follows the focusing lens unit is adapted to eliminate the variation of the aberrations.

In (i), mention may be made of the previous proposal for a telephoto lens in, for example, Japanese Laid-open patent Application No. Sho 59-176717 where the rear-focus method is used in combination with means for moving two lens members in differential relation, or in a so-called floating means, to compensate for variation of aberrations with focusing. However, this technique, because of necessitating differentiation of the focusing movements of the two members from each other, has alternative drawbacks. For example, the structure of construction of the operating mechanism becomes very complicated that the tolerance for centering has to be set far tighter, and further the motor torque should be increased as compared with lens members moved at the same speed. In application of, for example, an automatic focus control device to such an operating mechanism, a great increase of the dimensions of the drive source or motor is called for.

In (ii), because the necessary number of lens elements is increased and the weight is increased, with respect to the automatic focus control device, it is likely that similar drawbacks to those of (i) will be encountered.

The use of (iii) permits the focusing lens unit to be constructed in a simpler form. Therefore, the mechanical structure also becomes simpler, and moreover the tolerance for centering may be set looser. Further, the automatic focus control device can even be applied with an advantage lessening of the motor torque, etc.

Nonetheless, in the art of high-aperture telephoto lenses, there have been a few previous proposals for designing the lens unit that follows the focusing lens unit with a chief aim to assist in the stabilization of the aberration correction over the focusing range. Of these, the telephoto lens in Japanese Patent Publication No. Sho 56-13926 (U.S. Pat. No. 4,176,913) comprises three lens units of positive, negative, positive power in this order from the front with the focusing provision made at the second one, while the aberrations of the first and second lens units are balanced out by a suitable design of the third lens unit.

With the type of telephoto lens in that publication, however, when the aperture ratio is increased, a serious problem arises that good stability of aberration correction can no longer be maintained throughout the focusing range.

SUMMARY OF THE INVENTION

A first object of the invention is to provide a photographic lens capable of rear-focusing.

A second object is to provide a photographic lens which enables the variation of aberrations with focusing to be lessened to obtain an optimum image.

A third object is to provide a photographic lens of increased aperture ratio.

A fourth object is to advance the compactness of a photographic lens, particularly to reduce the diameter of the maximum aperture of the diaphragm, and to provide a lens having a back focal distance sufficient for a single-lens reflex camera.

Other objects of the invention will become apparent from the following description with reference to the drawings.

Figure 1:
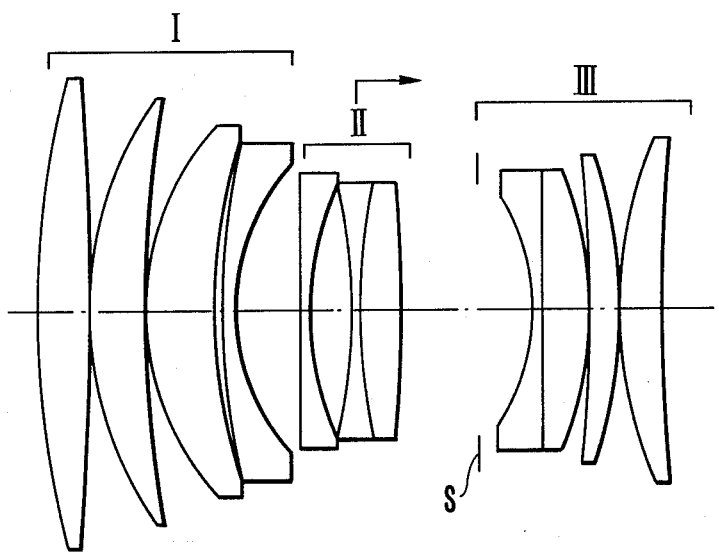
FIGS. 1 to 4 are longitudinal section views of examples 1 to 4 of specific lenses of the invention respectively.
Figure 2:
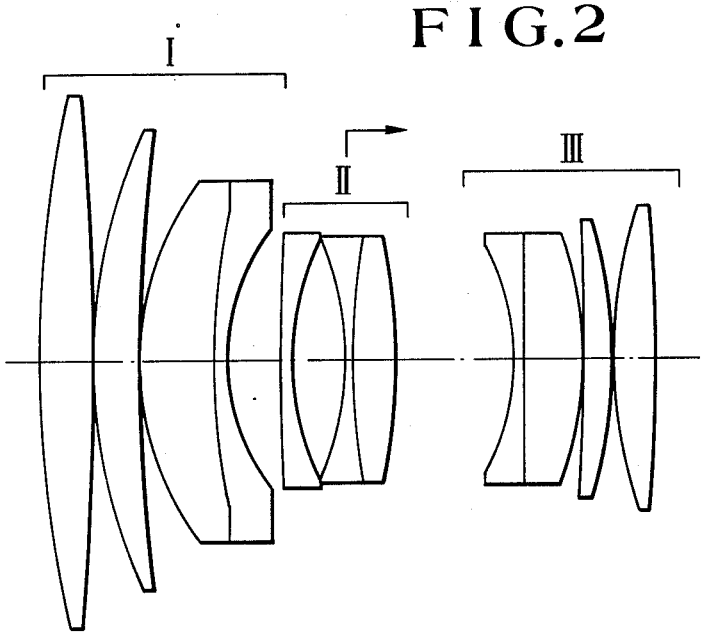
Figure 3:
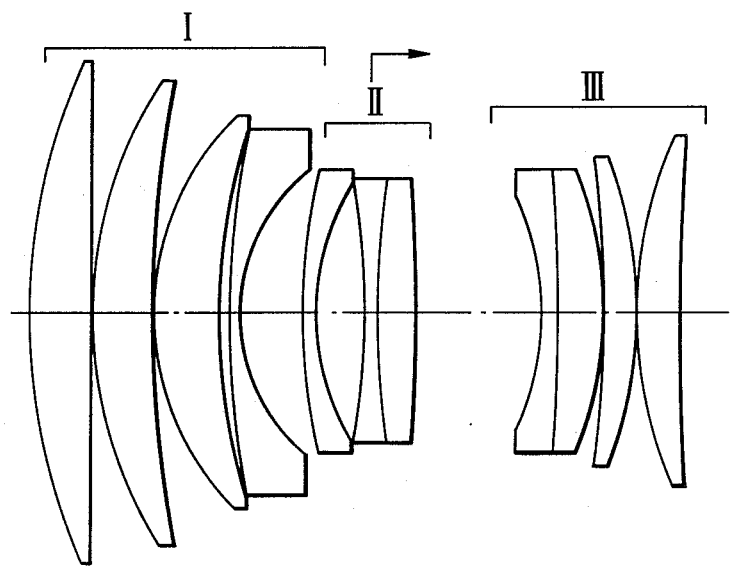
Figure 4:
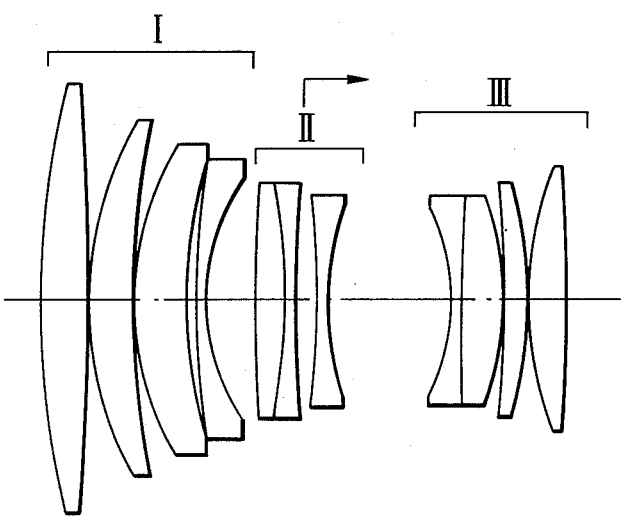

In these views and graphs, I, II and III denote the first, second and third lens units respectively, and $\Delta S$ and $\Delta M$ represent the sagittal and meridional image surfaces respectively.

DETAILED DESCRIPTION OF THE PREFERRED EMBODIMENTS

The present invention is next described in connection with embodiments thereof by reference to the drawings.

Referring first to FIGS. 1, 2, 3 and 4, there is shown one embodiment of the invention applied to the photographic lens comprising, from front to rear, a first lens unit I of positive power, a second lens unit II of negative power, and a third lens unit III of positive power. This or positive, negative, positive power arrangement over the entire system is taken as advantageous on the aberration correction.

In this embodiment, the second lens unit may axially move to effect focusing, or the inner-focus method may be employed. S is a stop.

Further, the first lens unit is provided with a negative lens whose rear surface is concave toward the rear, and the third lens unit is constructed with inclusion of a negative lens with the front surface of strong concave curvature toward the front, and at least two positive lenses in this order from the front. Whereby a great increase in the aperture ratio is realized in such a manner that the variation of aberrations with focusing is reduced.

More specifically, a light beam incident on the positive first lens unit is smoothly converged by positive lenses arranged on the object side in the first lens unit to suppress the generation of high order aberrations, and the negative lens arranged on the image side in the first lens unit performs aberration correction, so that the aberrations can be prevented from being generated in the whole first lens unit.

Next, the second lens unit axially moves rearward as focusing is effected from infinity to the minimum object distance, while the on-axial beam emerging from the first lens unit is sufficiently convergent so that spherical aberration tends to be under-corrected. This tendency remains unchanged over the entire focusing range, while the on-axial beam passing through the second lens unit takes a position near the optical axis as the negative second lens unit moves toward the image side. To allow for fulfillment of the requirements of reducing the diameter of the maximum aperture and the minimum F-number at once and also for good correction of such spherical aberration, therefore, according to the invention, the third lens unit is provided with a negative lens having a front surface of strong concave curvature toward the front to constitute the frontmost lens surface of that unit. It should be noted that the stop S is arranged in a position where the on-axial beam emerging from the second lens unit sufficiently converges itself to permit a minimization of the diameter of the maximum aperture to be achieved.

In general, where focusing is effected by moving the second lens unit, a great distance between the first lens unit and the third lens unit is required to obtain a space where the second lens unit moves. Therefore, it is difficult to realize a lens having a sufficient back focal distance. In addition, where the rear focusing method is employed for a large aperture lens, this difficulty is significantly increased. However, according to the present invention, a negative lens having a front surface of strong concave curvature is positioned on the frontmost side in the third lens unit, so that a sufficient back focal distance as well as the above aberration correction can be obtained.

Further, the invention sets forth a rule of design for the negative lens in the first lens unit and the frontmost negative lens in the third lens unit as follows:

$$1.0 < (1/f)(R1A/(N1A-1) - R3A/(N3A-1) + |f2|) < 3.0 \tag{1}$$

where R1A and N1A are respectively the radius of curvature of the rear surface and the refractive index of the medium of the negative lens in the first lens unit, R3A and N3A are respectively the radius of curvature of the front surface and the refractive index of the medium of the negative lens in the third lens unit, f2 is the focal length of the second unit, and f is the focal length of the entire system.

What the upper and lower limits of the inequalities of condition (1) mean is explained below.

When the upper limit is exceeded, under-correction of spherical aberration results. The Petzval sum also becomes difficult to minimize. Hence the curvature of field starts to deteriorate. When the lower limit is exceeded, although the Petzval sum becomes relatively small, and the spherical aberration can be corrected relatively well, off-axial aberrations, particularly coma, and higher order various aberrations become abundant. As a result, the image quality drops objectionably.

In this embodiment, focusing down from infinity to the minimum object distance is performed by moving the second lens unit toward the rear. Hence, the height of incidence of the on-axial ray on the second lens unit is lower when at the minimum object distance than when at infinity, causing the spherical aberration to proceed toward under-correction.

Therefore, by specifying the form and medium of the rearmost lens of the first lens unit as defined above, the Petzval sum is minimized and, at the same time, the spherical aberration which would otherwise be under-corrected is corrected toward over-correction. Thus, the aberrations are corrected in good balance over the focusing range.

Also, by specifying the form and medium of the frontmost negative lens as defined above, the power arrangement in the third lens unit is made with the negative power at the front and the positive power at the rear.

By this, the angle of incidence of the off-axial rays on the third lens unit is lessened to permit good correction of off-axial aberrations, when the aperture ratio is increased while preventing the diameter of the maximum aperture from increasing. Achieved in such a manner is a minimization of the bulk and size of the entire lens system.

As for the second lens unit, in this embodiment, it is constructed as including one positive lens and two negative lenses to correct itself so well that there will be little variation in aberrations with focusing for good stability of high grade optical performance over the extended focusing range.

To this purpose, it is preferred that the second lens unit is constructed from three lenses either in such a configuration as comprising, from front to rear, a meniscus-shaped lens of negative refractive power convex toward the front, a bi-concave negative lens, and a bi-convex positive lens, or in another configuration which comprises a bi-convex positive lens, a bi-concave negative lens and again a bi-concave negative lens.

For assisting further towards an improvement of the stabilization of aberration correction, the focal length f2 of the second lens unit preferably lies in the following range:

$$0.45 < |f2/f| < 1.4 \tag{2}$$

When the refractive power of the second lens unit is too strong as exceeding the lower limit of the range of condition (2), the spherical aberration tends to be under-corrected, and the field curvature at a relatively high image angle becomes difficult to correct, although the total focusing movement of the second lens unit is decreased to produce an advantage by shortening the total length of the entire system.

When the upper limit is exceeded, as the refractive power of the second lens unit is too weak, its total focusing movement becomes so long that the total length of the entire system is increased objectionably. Moreover, it becomes difficult to make the Petzval sum small.

In order to obtain a good compromise between the minimization of the bulk and size of the entire lens system and high grade imagery over the entire area of the picture frame, it is preferred in this embodiment to set forth ranges for the focal lengths f1 and f3 of the first and third lens units respectively as follows:

$$0.7 < f1/f < 1.5 \tag{3}$$

$$0.4 < f3/f < 0.8 \tag{4}$$

When the lower limit of the range of condition (3) is exceeded, as the refractive power of the first lens unit becomes too strong, all the aberrations ascribable to the first lens unit are increased to increase the range of variation of aberrations with focusing objectionably. Particularly when the positive lens in the first lens unit is made up of a large index glass to well correct aberrations, particularly, spherical aberration, the dispersion to be used is unavoidably limited to large values. Therefore, the range of variation of the lateral chromatic aberration with focusing is increased objectionably.

When the upper limit of the condition (3) is exceeded, as the refractive power of the first lens unit becomes too weak, the total length of the entire lens system is increased. In accompaniment with this, to admit fully an off-axial beam, the diameter of the front members is increased objectionably.

When the lower limit of the range of condition (4) is exceeded, as the refractive power of the third lens unit becomes too strong, the Petzval sum becomes difficult to make small. When the upper limit is exceeded, as the refractive power of the third lens unit becomes too weak, the diameter of the maximum aperture must be increased to secure the prescribed F-number. This results in an increase in the outer diameter of the lens system, which in turn increases the bulk and size of the entire lens system objectionably.

In order to secure a predetermined back focal distance with maintenance of good stability of aberration correction, it is preferred that within the framework of the conditions (3) and (4), the following condition is satisfied:

$$0.4 < e12/e23 < 1.7 \tag{5}$$

where e12 and e23 are the intervals between the principal points of the first and second lens units and between the principal points of the second and third lens units respectively.

When the upper limit of the inequalities of condition (5) is exceeded, the refractive powers of the second and third lens units must be strengthened to permit the back focal distance to be taken at a required value for the use of the second lens unit as the focusing one. This leads to an increase in the variation of aberrations with focusing objectionably. When the lower limit of the condition (5) is exceeded, the entire lens system is increased in the longitudinal direction, which in turn causes an objectionable increase in the lateral direction.

Since, in the present invention, the aperture ratio is increased, for achieving a further improvement of the imagery over the entire area of the picture frame at the maximum aperture, it is preferred that the first lens unit is constructed with four lens units, or a positive lens, a meniscus-shaped positive lens of forward convexity, a positive lens and a negative lens, and the third lens unit is constructed with a doublet of negative and positive lenses cemented together, and two positive lenses.

With especial regard to the relation between the diameter of the aperture stop S and the aberration correction, it should be pointed out that in all its embodiments, the invention sets forth the following condition:

$$R3A/((1-N3A) \cdot f) < 0.65$$

where f is the focal length of the entire lens system.

This range of conditions limits the refractive power of the frontmost lens surface of strong concave curvature toward the front in the third lens unit in terms of the focal length of the entire system. When the refracting power becomes weak as exceeding the upper limit of this condition, the third lens unit produces large under-corrected spherical aberration which is hardly balanced out by a design of any other lens units. Also, the difficulty of reducing the maximum aperture while preserving the faster F-number is increased.

The following examples 1 to 4 of a specific lenses of the invention can be constructed in accordance with the numerical data given in the following tables for the radii of curvature, R, the axial thicknesses or air separations, D, and the refractive indices, N, and Abbe numbers, $\nu$, of the lenses respectively with the subscripts numbered consecutively from front to rear.

The shape of an aspheric surface to be used is defined in coordinates whose X-axis is in the optical axis and H-axis in the direction perpendicular to the optical axis with the direction in which the light advances being taken as positive by the following equation for a departure X from the osculating sphere:

$$X = (1/R)H^2/(1+(1-(H/R)^2)^{\frac{1}{2}}) + AH^2 + BH^4 + CH^6 + DH^8 + EH^{10} + \ldots$$

where R is the radius of curvature of the sphere and A, B, C, D, E ... are the aspheric coefficients.

The values of the factors in the above-cited conditions for these examples 1 to 4 are also listed in Table-1.

Figure 5:
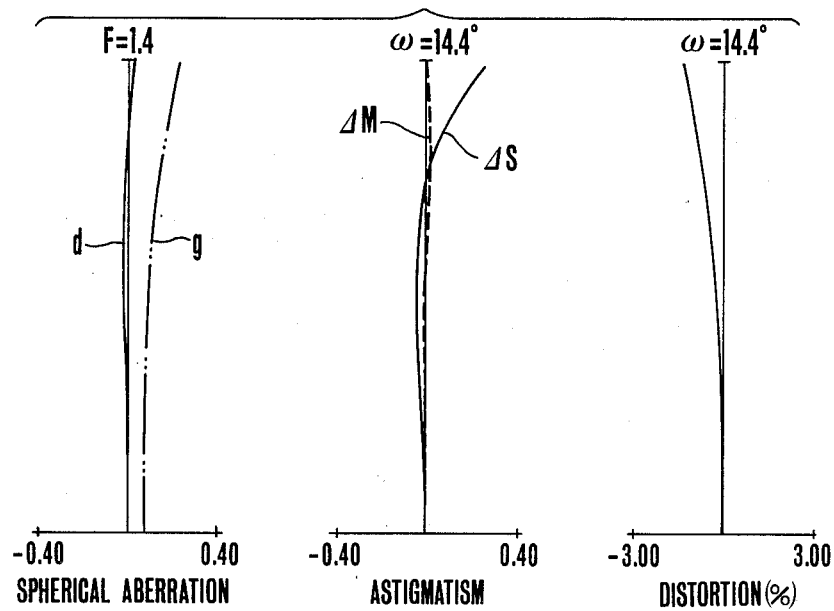
FIGS. 5 to 8 are graphic representations of the aberrations of the examples 1 to 4 respectively with an infinitely distant object.

Numerical Example 1 (FIGS. 1 and 5):

| F = 100 | FNo = 1:1.4 | $2\omega$ = 28.8° | |
|---|---|---|---|
| R1 = 135.32 | D1 = 8.30 | N1 = 1.60311 | $\nu$1 = 60.7 |
| R2 = −909.54 | D2 = 0.18 | | |
| R3 = 62.01 | D3 = 8.83 | N2 = 1.69680 | $\nu$2 = 55.5 |
| R4 = 190.63 | D4 = 0.18 | | |
| R5 = 44.91 | D5 = 10.67 | N3 = 1.74400 | $\nu$3 = 44.8 |
| R6 = 99.45 | D6 = 1.19 | | |
| R7 = 125.98 | D7 = 1.78 | N4 = 1.80518 | $\nu$4 = 25.4 |
| R8 = 32.33 | D8 = 9.72 | | |
| R9 = 1066.72 | D9 = 1.78 | N5 = 1.57250 | $\nu$5 = 57.8 |
| R10 = 47.61 | D10 = 5.93 | | |
| R11 = −138.94 | D11 = 1.78 | N6 = 1.62606 | $\nu$6 = 39.2 |
| R12 = 118.52 | D12 = 5.93 | N7 = 1.76182 | $\nu$7 = 26.6 |
| R13 = −347.51 | D13 = 20.18 | | |
| R14 = −38.90 | D14 = 2.37 | N8 = 1.75520 | $\nu$8 = 27.5 |
| R15 = −592.62 | D15 = 7.11 | N9 = 1.77250 | $\nu$9 = 49.6 |
| R16 = −56.84 | D16 = 0.24 | | |
| R17 = −254.19 | D17 = 4.95 | N10 = 1.78590 | $\nu$10 = 44.2 |
| R18 = −64.89 | D18 = 0.24 | | |
| R19 = 66.72 | D19 = 6.62 | N11 = 1.69680 | $\nu$11 = 55.5 |
| R20 = 642.71 | | | |

Figure 6:
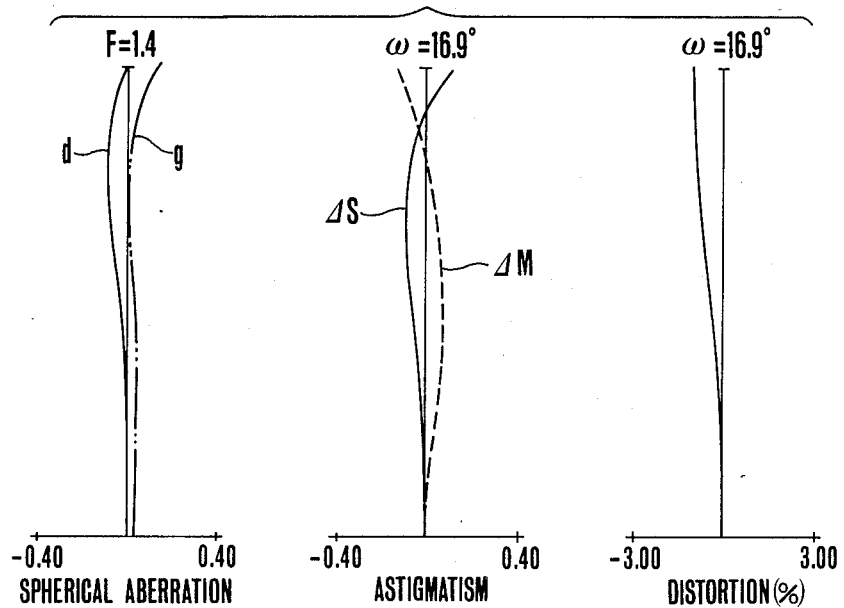

Numerical Example 2 (FIGS. 2 and 6):

| F = 100 | FNo = 1:1.4 | $2\omega$ = 33.8° | |
|---|---|---|---|
| R1 = 211.97 | D1 = 10.24 | N1 = 1.62299 | $\nu$1 = 58.2 |
| R2 = −757.79 | D2 = 0.21 | | |
| R3 = 97.03 | D3 = 8.42 | N2 = 1.69680 | $\nu$2 = 55.5 |
| R4 = 338.97 | D4 = 0.21 | | |
| R5 = 53.01 | D5 = 14.03 | N3 = 1.74400 | $\nu$3 = 44.8 |
| R6 = 168.36 | D6 = 2.10 | N4 = 1.78472 | $\nu$4 = 25.7 |
| R7 = 43.02 | D7 = 9.82 | | |
| R8 = 301.89 | D8 = 2.10 | N5 = 1.57250 | $\nu$5 = 57.8 |
| R9 = 50.40 | D9 = 9.12 | | |
| R10 = −66.22 | D10 = 2.10 | N6 = 1.53172 | $\nu$6 = 48.9 |
| R11 = 126.27 | D11 = 7.02 | N7 = 1.74950 | $\nu$7 = 35.3 |
| R12 = −120.13 | D12 = 21.74 | | |
| R13 = −46.66 | D13 = 2.10 | N8 = 1.80518 | $\nu$8 = 25.4 |
| R14 = −1122.45 | D14 = 10.52 | N9 = 1.80400 | $\nu$9 = 46.6 |
| R15 = −65.15 | D15 = 0.28 | | |
| R16 = −636.65 | D16 = 5.33 | N10 = 1.80400 | $\nu$10 = 46.6 |
| R17 = −87.56 | D17 = 0.28 | | |
| R18 = 93.72 | D18 = 7.02 | N11 = 1.69680 | $\nu$11 = 55.5 |
| R19 = −1674.70 | | | |

| R5; Aspheric coefficients | |
|---|---|
| A = 0.0 | B = −7.718 × 10$^{-8}$ |
| C = 3.568 × 10$^{-11}$ | D = −6.291 × 10$^{-14}$ |

Figure 7:
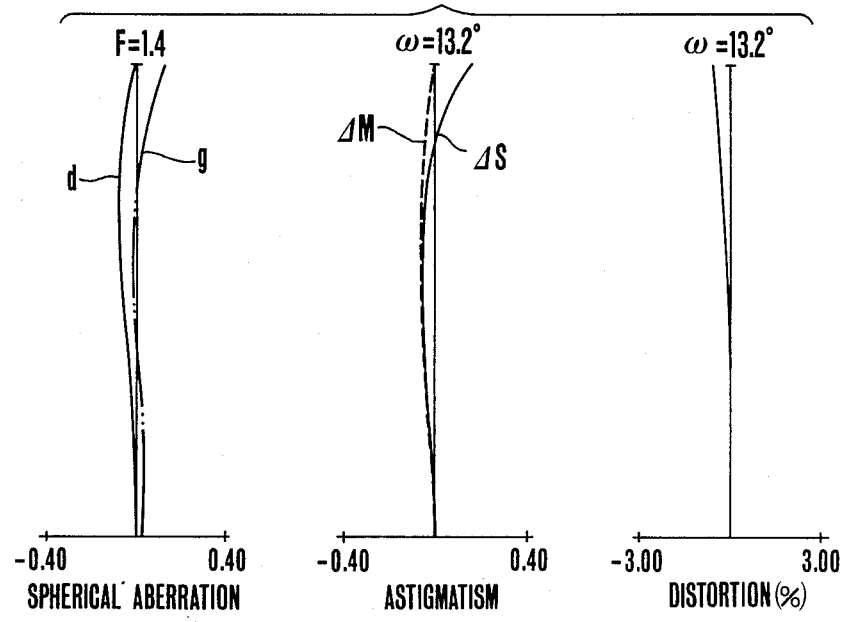

Numerical Example 3 (FIGS. 3 and 7):

| F = 100 | FNo = 1:1.4 | $2\omega$ = 26.5° | |
|---|---|---|---|
| R1 = 90.01 | D1 = 8.70 | N1 = 1.60311 | $\nu$1 = 60.7 |
| R2 = 2578.31 | D2 = 0.16 | | |
| R3 = 60.23 | D3 = 8.80 | N2 = 1.69680 | $\nu$2 = 55.5 |
| R4 = 152.46 | D4 = 0.16 | | |
| R5 = 40.70 | D5 = 9.78 | N3 = 1.72000 | $\nu$3 = 50.2 |
| R6 = 92.95 | D6 = 1.09 | | |
| R7 = 120.41 | D7 = 1.63 | N4 = 1.76182 | $\nu$4 = 26.6 |
| R8 = 28.59 | D8 = 9.24 | | |
| R9 = 102.31 | D9 = 1.63 | N5 = 1.62280 | $\nu$5 = 57.0 |
| R10 = 39.61 | D10 = 6.52 | | |
| R11 = −97.19 | D11 = 1.63 | N6 = 1.62374 | $\nu$6 = 47.1 |
| R12 = 108.69 | D12 = 5.43 | N7 = 1.75520 | $\nu$7 = 27.5 |
| R13 = −445.20 | D13 = 18.59 | | |
| R14 = −36.34 | D14 = 2.17 | N8 = 1.72825 | $\nu$8 = 28.5 |
| R15 = −326.06 | D15 = 6.52 | N9 = 1.77250 | $\nu$9 = 49.6 |
| R16 = −51.63 | D16 = 0.22 | | |
| R17 = −145.51 | D17 = 4.54 | N10 = 1.78590 | $\nu$10 = 44.2 |
| R18 = −60.93 | D18 = 0.22 | | |
| R19 = 63.21 | D19 = 6.07 | N11 = 1.69680 | $\nu$11 = 55.5 |
| R20 = 2004.59 | | | |

Figure 8:
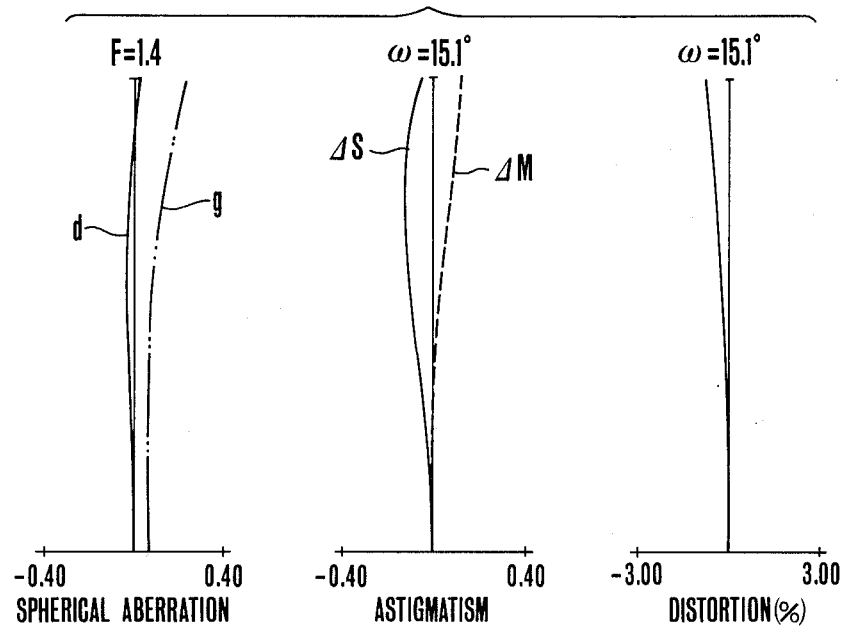
Figure 9:
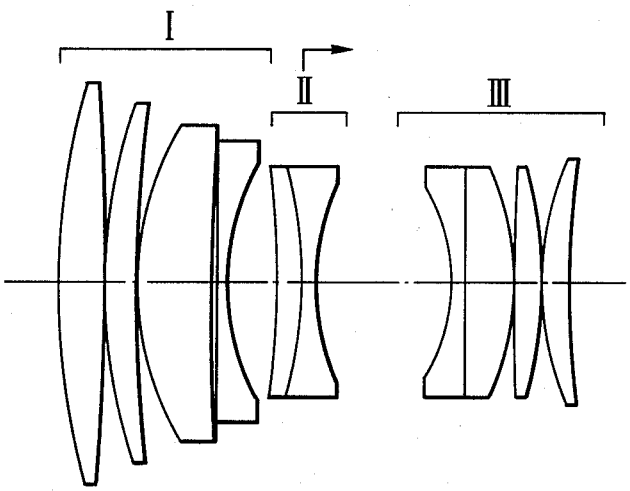
FIGS. 9 to 12 are longitudinal section views of examples 5 to 8 of specific lenses of the invention respectively.
Figure 10:
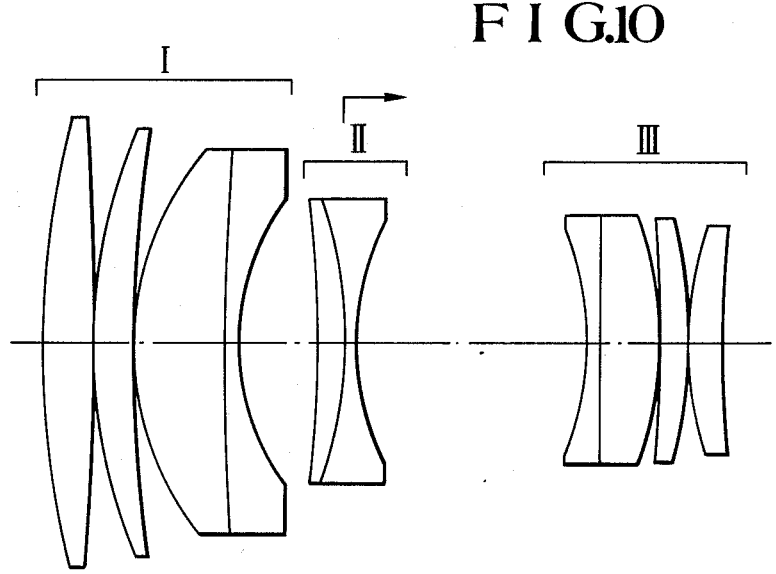
Figure 11:
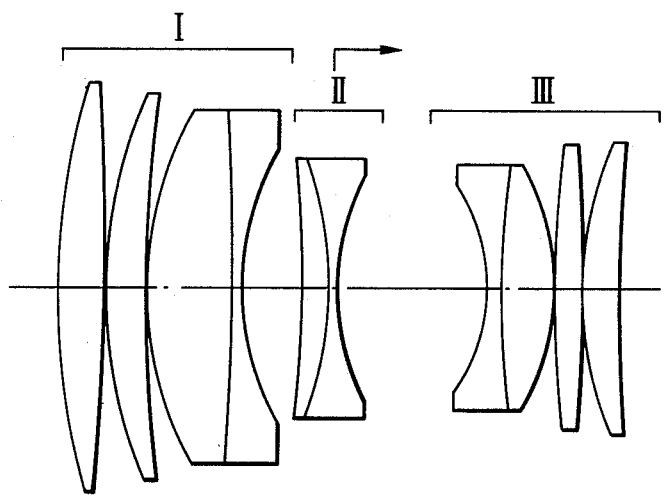
Figure 12:
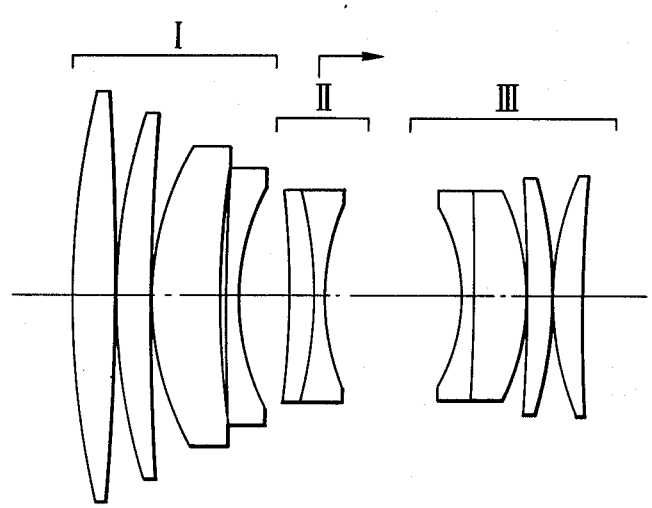

Numerical Example 4 (FIGS. 4 and 8):

| F = 100 | FNo = 1:1.4 | $2\omega$ = 30.2 | |
|---|---|---|---|
| R1 = 162.85 | D1 = 9.95 | N1 = 1.60311 | $\nu$1 = 60.7 |
| R2 = −481.46 | D2 = 0.19 | | |
| R3 = 69.84 | D3 = 8.71 | N2 = 1.69680 | $\nu$2 = 55.5 |
| R4 = 183.45 | D4 = 0.19 | | |
| R5 = 57.27 | D5 = 11.19 | N3 = 1.74400 | $\nu$3 = 44.8 |
| R6 = 141.91 | D6 = 1.24 | | |
| R7 = 202.94 | D7 = 1.87 | N4 = 1.78472 | $\nu$4 = 25.7 |
| R8 = 43.52 | D8 = 9.08 | | |
| R9 = 359.82 | D9 = 6.22 | N5 = 1.83400 | $\nu$5 = 37.2 |
| R10 = −124.35 | D10 = 1.87 | N6 = 1.69680 | $\nu$6 = 55.5 |
| R11 = 303.48 | D11 = 3.73 | | |
| R12 = −215.52 | D12 = 1.87 | N7 = 1.61720 | $\nu$7 = 54.0 |
| R13 = 51.69 | D13 = 24.25 | | |
| R14 = −45.96 | D14 = 2.49 | N8 = 1.78472 | $\nu$8 = 25.7 |
| R15 = −621.79 | D15 = 7.46 | N9 = 1.77250 | $\nu$9 = 49.6 |
| R16 = −62.39 | D16 = 0.25 | | |
| R17 = −443.75 | D17 = 5.19 | N10 = 1.78590 | $\nu$10 = 44.2 |
| R18 = −79.47 | D18 = 0.25 | | |
| R19 = 71.66 | D19 = 6.95 | N11 = 1.69680 | $\nu$11 = 55.5 |
| R20 = −554.43 | | | |

TABLE-1

| | Numerical Examples | | | |
|---|---|---|---|---|
| | 1 | 2 | 3 | 4 |
| $\frac{1}{f}\left(\frac{R1A}{N1A-1} - \frac{R3A}{N3A-1} + |f2|\right)$ | 1.713 | 2.251 | 1.758 | 1.884 |
| f1/f | 1.006 | 1.129 | 0.957 | 1.101 |
| \|f2/f\| | 0.796 | 1.124 | 0.762 | 0.744 |
| f3/f | 0.610 | 0.691 | 0.593 | 0.566 |
| e12/e23 | 0.989 | 1.045 | 0.98 | 0.94 |

Furthermore, the following condition is preferably satisfied:

$$0.6 < |RII/(NII-1)|/|RIII/(NIII-1)| < 4$$

where RII is a radius of curvature of a lens surface having the strongest negative refractive power in the second lens unit, NII is a refractive index of a glass having the lens surface of the radius of curvature RII, RIII is a radius of curvature of the frontmost lens surface in the third lens unit, and NIII is a refractive index of a glass having the lens surface of the radius of curvature RIII.

This range of condition determines the ratio of a refractive power of the lens surface having the strongest negative refractive power in the second lens unit to a negative refractive power of the frontmost lens surface in the third lens unit. When the lower limit of this condition is exceeded, that is, a refractive power of the lens surface RII is strengthened as compared with that of the lens surface RIII, a negative refractive power of the second lens unit becomes strong. Therefore, it becomes difficult to correct a spherical aberration and various aberrations in a balanced manner, and, particularly, an outward coma becomes large. Furthermore, the aberration variation caused by focusing is increased. Otherwise, when the lower limit of the condition is exceeded, a refractive power of a negative lens in the third lens unit becomes weak. Therefore, the advantage of the aberration correction by the negative lens in the third lens unit having a positive refractive power is lowered, and the aberration variation caused by focusing is increased. Furthermore, the retro-type effect of the third lens unit is lowered, so that it is difficult to obtain a sufficient back focal distance, and the diameter of a stop is increased. On the other hand, when the upper limit of the condition is exceeded, that is, a refractive power of the lens surface of the lens surface RII is weakened as compared with that of the lens surface RIII, a negative refractive power of the second lens unit becomes weak. Therefore, it becomes difficult to correct the various aberrations in a balanced manner, and, particularly, an inward coma is increased. Furthermore, the amount of movement of the second lens unit for focusing is increased, so that a large space is required. This results in an undersirable increase in the total length of the lens. Otherwise, when the upper limit of the condition is exceeded, a negative refractive power of the first surface of the third lens unit becomes strong. Therefore, it becomes difficult to correct the various aberrations in a balanced manner, and, particularly, a sagittal flare is increased.

Though, in the foregoing embodiment, the second lens unit has been constructed with three lens elements, even two lens elements are at all acceptable in view of an emphasis on the further reduction of its weight. In this connection, another embodiment is described below.

FIGS. 9, 10, 11 and 12 in block diagrams illustrate that embodiment, respectively corresponding to specific examples 5, 6, 7 and 8 thereof.

For this case, it is preferred that the second lens unit is constructed from a meniscus-shaped positive lens of rearward convexity and a bi-concave negative lens, wherein, within the framework of the numerical condition (1), the following conditions are satisfied:

$$0.1 < N2A - N2B \quad (6)$$

$$10 < \nu 2B - \nu 2A \quad (7)$$

where N2A and N2B are the refractive indices of the positive and negative lenses respectively, and $\nu 2A$ and $\nu 2B$ are the Abbe numbers of the materials of the positive and negative lenses respectively.

The inequality of condition (6) represents a range for the difference between the refractive indices of the materials of the positive and negative lenses of the second lens unit. When the refractive index difference is too small as violating the condition (6), image surface characteristics from the intermediate to the marginal zone of the picture frame become very difficult to correct well.

The range of condition (7) represents a range for the difference between the Abbe numbers of the materials of the positive and negative lenses of the second lens unit. When the Abbe number difference is too small as violating the condition (7), the range of variation of chromatic aberrations with focusing is increased, and this is not desirable.

Figure 13:
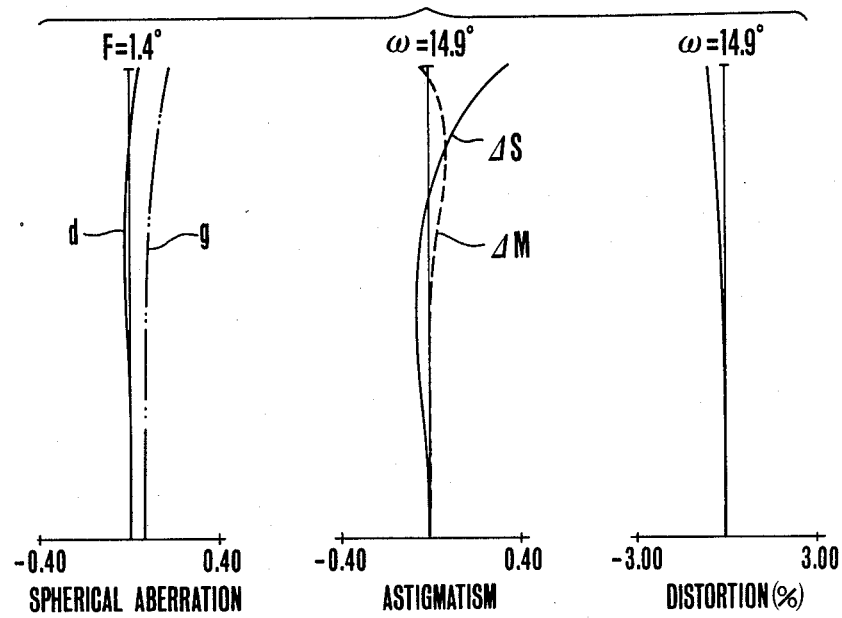
FIGS. 13 to 16 are graphic representations of the aberrations of the examples 9 to 12 respectively with an infinitely distant object.

Each of the numerical examples 5 to 8 of this embodiment is designed according to not only the ranges (6) and (7) but also the ranges (1) to (5), as will be seen from the list of the values of the factors in the conditions for these examples in Table-2. The numerical data in accordance with which the examples 5 to 8 can be constructed are given below:

Numerical Example 5 (FIGS. 9 and 13):

| F = 100 FNo = 1:14 2ω = 29.6° | | | |
|---|---|---|---|
| R1 = 140.82 | D1 = 8.95 | N1 = 1.61800 | ν1 = 63.4 |
| R2 = −861.97 | D2 = 0.18 | | |
| R3 = 107.84 | D3 = 6.64 | N2 = 1.71300 | ν2 = 53.8 |
| R4 = 315.70 | D4 = 0.18 | | |
| R5 = 57.86 | D5 = 14.63 | N3 = 1.77250 | ν3 = 49.6 |
| R6 = 479.16 | D6 = 0.61 | | |
| R7 = 869.28 | D7 = 2.44 | N4 = 1.75520 | ν4 = 27.5 |
| R8 = 47.09 | D8 = 10.21 | | |
| R9 = −168.24 | D9 = 4.88 | N5 = 1.84666 | ν5 = 23.9 |
| R10 = −78.24 | D10 = 2.44 | N6 = 1.57957 | ν6 = 53.7 |
| R11 = 51.08 | D11 = 26.44 | | |
| R12 = −40.54 | D12 = 2.44 | N7 = 1.80518 | ν7 = 25.4 |
| R13 = −673.57 | D13 = 9.76 | N8 = 1.83481 | ν8 = 42.7 |
| R14 = −53.79 | D14 = 0.18 | | |
| R15 = 4222.89 | D15 = 5.29 | N9 = 1.77250 | ν9 = 49.6 |
| R16 = −82.79 | D16 = 0.18 | | |
| R17 = 66.05 | D17 = 5.05 | N10 = 1.61800 | ν10 = 63.4 |
| R18 = 218.30 | | | |

Figure 14:
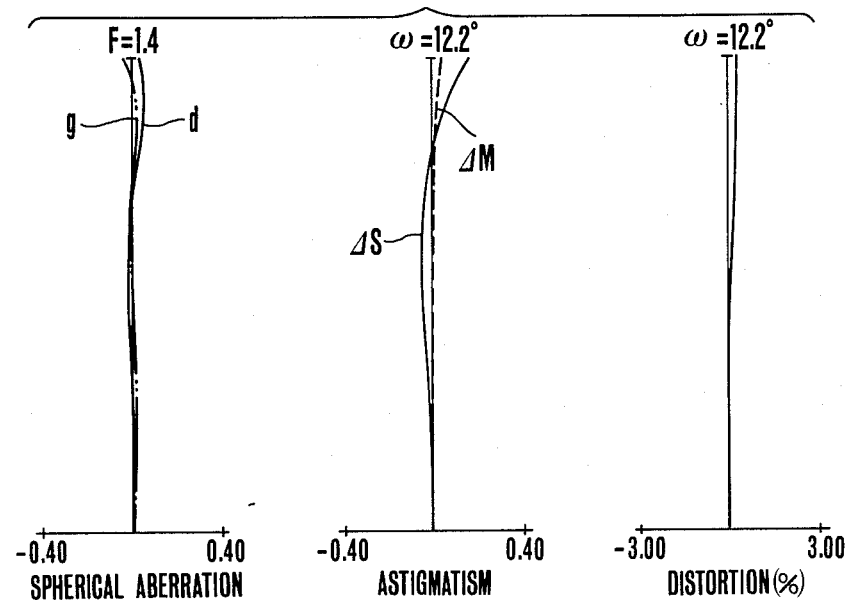

Numerical Example 6 (FIGS. 10 and 14):

| F = 100 FNo = 1:1.4 2ω = 24.4° | | | |
|---|---|---|---|
| R1 = 162.59 | D1 = 8.50 | N1 = 1.61800 | ν1 = 63.4 |
| R2 = −673.59 | D2 = 0.15 | | |
| R3 = 86.84 | D3 = 6.50 | N2 = 1.71300 | ν2 = 53.8 |
| R4 = 275.25 | D4 = 0.15 | | |
| R5 = 51.19 | D5 = 14.60 | N3 = 1.77250 | ν3 = 49.6 |
| R6 = 500.02 | D6 = 2.20 | N4 = 1.76182 | ν4 = 26.6 |
| R7 = 40.97 | D7 = 10.21 | | |
| R8 = −164.82 | D8 = 4.50 | N5 = 1.84666 | ν5 = 23.9 |
| R9 = −66.29 | D9 = 2.00 | N6 = 1.57957 | ν6 = 53.7 |
| R10 = 44.82 | D10 = 22.23 | | |
| R11 = −45.08 | D11 = 2.20 | N7 = 1.80518 | ν7 = 25.4 |
| R12 = −673.60 | D12 = 9.00 | N8 = 1.83481 | ν8 = 42.7 |
| R13 = −59.23 | D13 = 0.15 | | |
| R14 = −379.94 | D14 = 5.10 | N9 = 1.77250 | ν9 = 49.6 |
| R15 = −74.49 | D15 = 0.15 | | |
| R16 = 58.79 | D16 = 5.00 | N10 = 1.61800 | ν10 = 63.4 |
| R17 = 189.33 | | | |

| R5; Aspheric coefficients | |
|---|---|
| A = 0.0 | B = −4.23969 × $10^{-8}$ |
| B = 7.11165 × $10^{-12}$ | D = −6.07905 × $10^{-14}$ |

Figure 15:
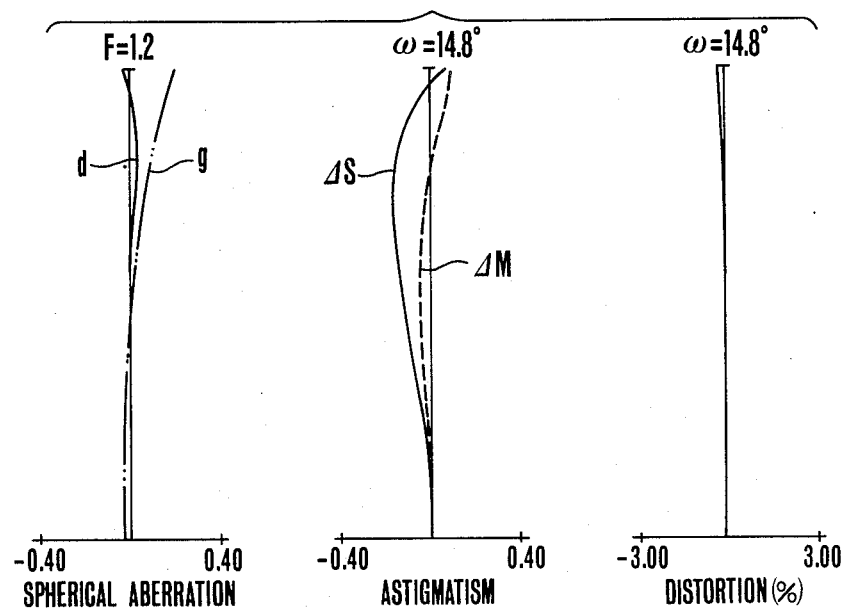

Numerical Example 7 (FIGS. 11 and 15):

| F = 100 FNo = 1:1.2 2ω = 29.6° | | | |
|---|---|---|---|
| R1 = 156.22 | D1 = 8.96 | N1 = 1.60311 | ν1 = 60.7 |
| R2 = −554.00 | D2 = 0.18 | | |
| R3 = 94.70 | D3 = 7.80 | N2 = 1.69680 | ν2 = 55.5 |

-continued

| F = 100 FNo = 1:1.2 2ω = 29.6° | | | |
|---|---|---|---|
| R4 = 265.53 | D4 = 0.18 | | |
| R5 = 72.35 | D5 = 17.46 | N3 = 1.71300 | ν3 = 53.8 |
| R6 = −944.20 | D6 = 2.44 | N4 = 1.74077 | ν4 = 27.8 |
| R7 = 59.10 | D7 = 11.31 | | |
| R8 = −196.91 | D8 = 4.88 | N5 = 1.80518 | ν5 = 25.4 |
| R9 = −77.13 | D9 = 2.44 | N6 = 1.61800 | ν6 = 63.4 |
| R10 = 52.83 | D10 = 28.64 | | |
| R11 = −39.76 | D11 = 2.44 | N7 = 1.75520 | ν7 = 27.5 |
| R12 = 163.65 | D12 = 10.98 | N8 = 1.77250 | ν8 = 49.6 |
| R13 = −46.37 | D13 = 0.18 | | |
| R14 = 244.30 | D14 = 5.13 | N9 = 1.88300 | ν9 = 40.8 |
| R15 = −351.24 | D15 = 0.18 | | |
| R16 = 76.64 | D16 = 7.29 | N10 = 1.71300 | ν10 = 53.8 |
| R17 = 982.28 | | | |

| R3; Aspheric coefficients | |
|---|---|
| A = 0.0 | B = −2.82629 × 10⁻⁸ |
| C = −7.951 × 10⁻¹² | D = −3.01197 × 10⁻¹⁵ |

Figure 16:
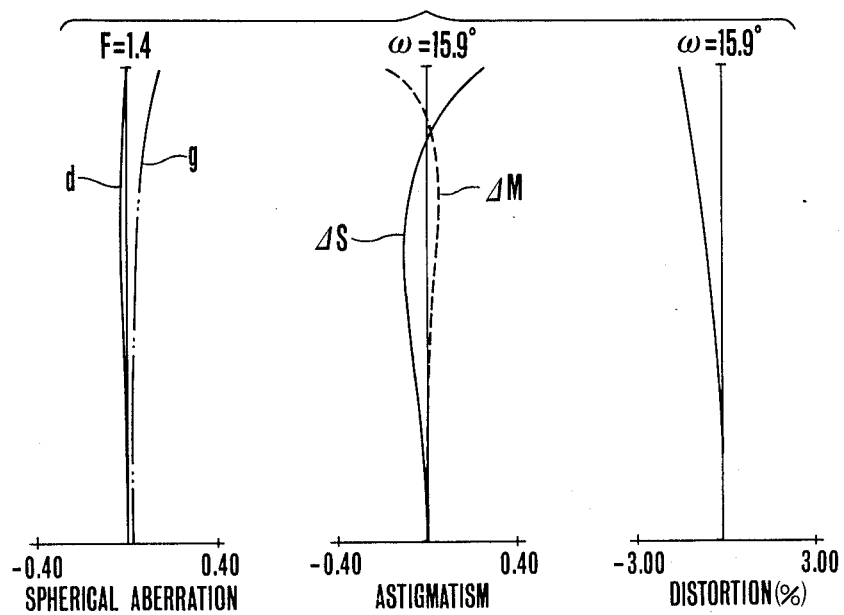

Numerical Example 8 (FIGS. 12 and 16):

| F = 100 FNo = 1:1.4 2ω = 31.9° | | | |
|---|---|---|---|
| R1 = 202.26 | D1 = 9.69 | N1 = 1.61800 | ν1 = 63.4 |
| R2 = −696.50 | D2 = 0.20 | | |
| R3 = 134.56 | D3 = 7.19 | N2 = 1.71300 | ν2 = 53.8 |
| R4 = 718.95 | D4 = 0.20 | | |
| R5 = 59.88 | D5 = 15.84 | N3 = 1.77250 | ν3 = 49.6 |
| R6 = 334.31 | D6 = 0.66 | | |
| R7 = 533.55 | D7 = 2.64 | N4 = 1.75520 | ν4 = 27.5 |
| R8 = 51.28 | D8 = 11.05 | | |
| R9 = −200.37 | D9 = 5.28 | N5 = 1.84666 | ν5 = 23.9 |
| R10 = −92.30 | D10 = 2.64 | N6 = 1.57957 | ν6 = 53.7 |
| R11 = 57.74 | D11 = 23.05 | | |
| R12 = −41.80 | D12 = 2.64 | N7 = 1.80518 | ν7 = 25.4 |
| R13 = −729.18 | D13 = 10.56 | N8 = 1.83481 | ν8 = 42.7 |
| R14 = −54.56 | D14 = 0.20 | | |
| R15 = −719.03 | D15 = 5.73 | N9 = 1.77250 | ν9 = 49.6 |
| R16 = −89.33 | D16 = 0.20 | | |
| R17 = 66.16 | D17 = 5.47 | N10 = 1.61800 | ν10 = 63.4 |
| R18 = 432.97 | | | |

TABLE-2

| | Numerical Examples | | | |
|---|---|---|---|---|
| | 5 | 6 | 7 | 8 |
| $\frac{1}{f}\left(\frac{R1A}{N1A - 1} - \frac{R3A}{N3A - 1} + |f2|\right)$ | 1.891 | 1.804 | 1.760 | 2.146 |
| f1/f | 1.006 | 0.881 | 1.000 | 1.129 |
| \|f2/f\| | 0.764 | 0.706 | 0.740 | 0.894 |
| f3/f | 0.621 | 0.647 | 0.590 | 0.633 |
| e12/e23 | 0.989 | 1.045 | 0.980 | 0.940 |
| N2A − N2B | 0.26709 | 0.26709 | 0.18718 | 0.26709 |
| ν2B − ν2A | 29.8 | 29.8 | 38 | 29.8 |

The foregoing embodiments have been described in connection with examples of application of the present invention to photographic lenses of focal lengths ranging from 50 to 100 mm, for the known Leica TM format. In the following, on the other hand, application of the invention to even longer telephoto, say, 200-300 mm, lenses will be exemplified.

Figure 17:
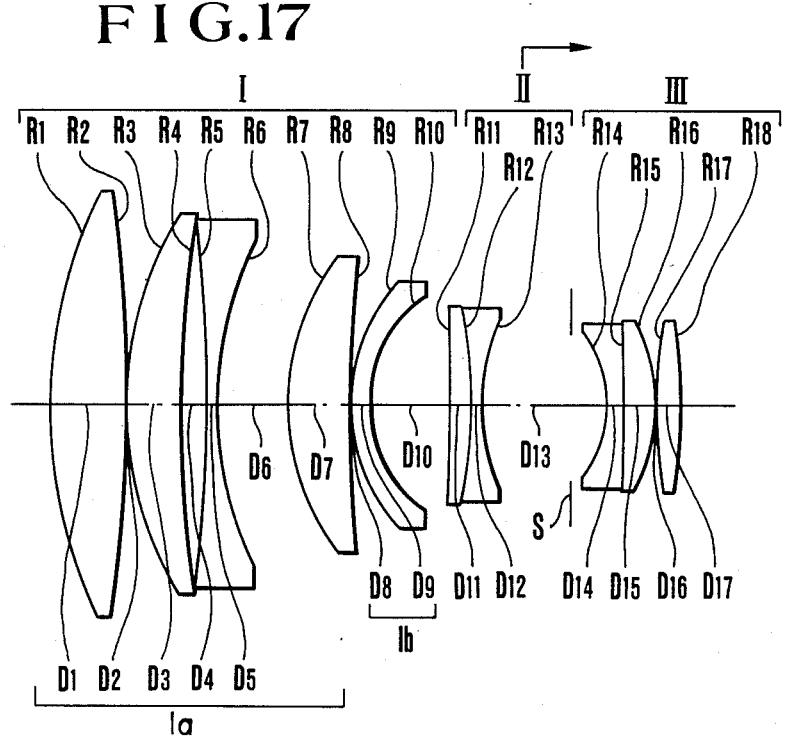
FIGS. 17, 18, 19, 23 and 24 are longitudinal section views of examples 9 to 13 of specific lenses of the invention respectively.
Figure 18:
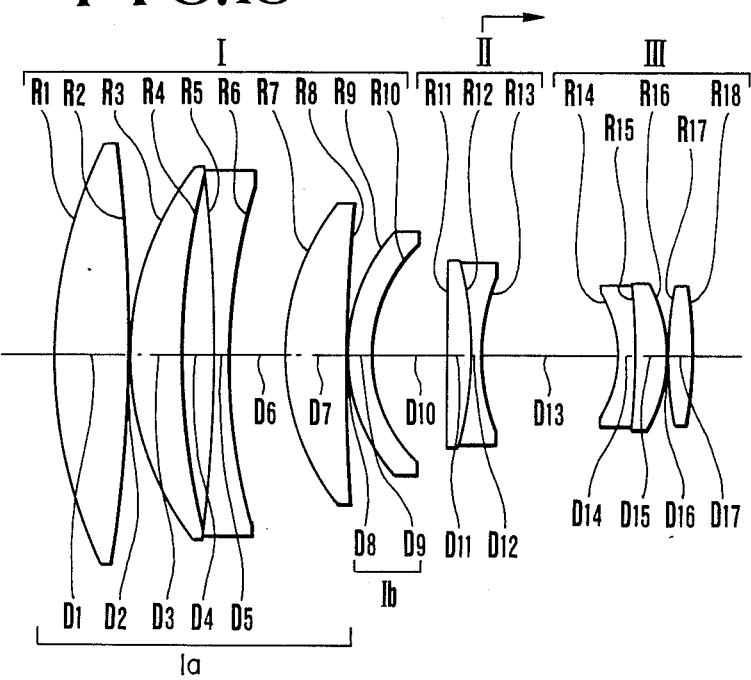
Figure 19:
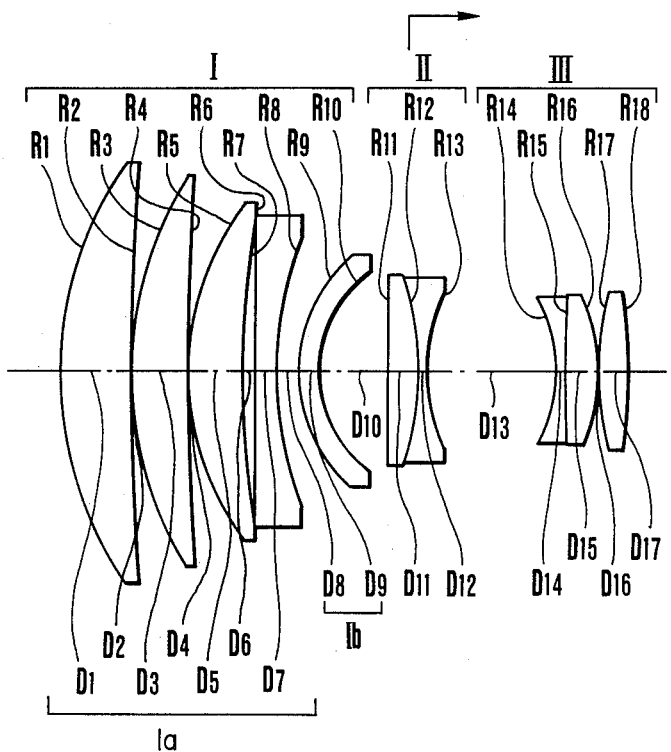

Referring to FIGS. 17, 18 and 19, the first lens unit I is constructed as including three positive lenses and two negative lenses. One of the negative lenses is a meniscus lens Ib convex toward the front, and takes its place at the most image side. S is an aperture stop.

The second lens unit II of negative power axially moves rearward to effect focusing down from infinity to the minimum object distance. The third lens unit III has its frontmost lens surface of concave curvature turned toward the front. A negative lens of this surface takes a form of facilitating correction of spherical aberration and coma. Further, positioned on the image side of this negative lens are at least two positive lenses having an image forming function.

In this embodiment, arranged in the rearmost position of the first lens unit I is a rearmost lens sub-unit Ib of meniscus form that is convex toward the front. This rearmost lens sub-unit Ib, in view of the general trend that the range of variation of aberrations increases in proportion to the focal length, may be regarded as a supplementary lens for suppressing the aberrations. Concerning the function of the rearmost lens sub-unit Ib as the supplementary lens, a more full explanation will follow.

To begin with, as for the lenses, positive and negative, other than the lens Ib in the first lens unit, what functions they have now are explained. The use of at least the two positive lenses from the front side provides a possibility of smoothly converging the light beam in passing through the first lens unit to lessen the higher order aberrations produced. Since the lens unit that follows the first is moved for focusing purposes, this leads to an assistance in reducing the range of variation of aberrations with focusing to a negligible magnitude.

Particularly in the specific examples 9 to 10, by the air lens formed between the second positive and the first negative lenses counting from the front, a further improvement of correction of the spherical aberration and field curvature is achieved. Due to the negative meniscus-shaped rearmost lens sub-unit Ib of forward convexity, a good stability of correction of the aberrations, particularly inward coma and the otherwise over-corrected aberrations of the meridional image surface, is maintained throughout the focusing range.

The second lens unit is constructed as including a doublet of positive and negative lenses cemented together to correct flare of spherical aberration for the spectral g-line, and variation with focusing of chromatic aberrations is in good balance.

The third lens unit III of positive power is constructed in the form of the so-called Gauss type from a doublet consisting of a negative lens whose front surface is of strong curvature concave toward the front, and a positive lens whose rear surface is of strong curvature convex toward the rear and a bi-convex lens. Thus, the variation of higher order spherical aberrations is compensated for, and the coma is corrected well. Also, the kinds of glasses to be used in the negative and positive lenses of the doublet are so chosen as to well correct chromatic aberration.

For accomplishing the objects of the invention to achieve improved results, if the telephoto lens comprises, from front to rear, the first lens unit of positive power, the second lens unit of negative power movable for focusing, and the third lens unit of positive power with its frontmost negative lens whose front surface is of strong concave curvature toward the front, it is preferred to set forth the following rules of design:

$$0.7 < f_1/f < 0.9 \quad (8)$$

$$0.45 < |f_2|/f < 0.7 \quad (9)$$

$$2.5 < |\phi_{3a}| \cdot f < 4.5 \quad (10)$$

where f is the focal length of the entire system; $f_1$ is the focal length of the first lens unit; $f_2$ is the focal length of the second lens unit; and $\phi_{3a}$ is the refractive power of the frontmost lens surface in the third lens. In this connection it should be noted that for shortening the total length, the upper limits of the ranges (8) and (9) may be lowered to 0.85 and 0.6 respectively.

In order to obtain a higher grade imaging performance, the first lens unit desirably includes at least three positive and two negative lenses, one of the negative lenses being arranged at the rearmost position, and being formed to a negative meniscus shape convex toward the front, and the second lens unit includes at least one positive and one negative lenses in the form of a cemented doublet. On the other hand, the third lens unit includes, at the frontmost position, a cemented doublet consisting of a negative lens whose front surface is of strong concave curvature toward the front and a positive lens in this order from the front, satisfying the following condition:

$$|(\theta_{3a}-\theta_{3b})/(\nu_{3a}-\nu_{3b})| < 0.002 \quad (11)$$

where $\theta_{3a}$ and $\nu_{3a}$ are the partial dispersion ratio and Abbe number of the negative lens in the cemented doublet of the third lens unit respectively, and $\theta_{3b}$ and $\nu_{3b}$ are the partial dispersion ratio and Abbe number of the positive lens in the cemented doublet of the third lens respectively.

The technical significance of each of the above-defined ranges of conditions is explained below.

The range of condition (8) represents the positive refractive power of the first lens unit to shorten mainly the physical length of the entire system in such a manner that all aberrations are corrected in good balance over the entire area of the picture frame at an increased maximum aperture. When the upper limit of the condition (8) is exceeded, as the refractive power of the first lens unit is too weak, the diameter of the third lens and those that follow in the first lens unit is increased, and, because the second lens unit is used for focusing, its total movement is increased. As a result, a space long enough to accommodate that movement has to be ensured. Thus, the physical length of the entire lens system tends to increase. When the lower limit of the condition (8) is exceeded, as the refractive power of the first lens unit becomes too strong, although the physical length is shortened, the aberrations at the increased aperture ratio, particularly under-corrected meridional image surface and over-corrected distortion, become more difficult to correct well.

Also, in the case of the above-described construction and arrangements of the constituent lenses of the first lens unit, when the refractive power of the first lens unit becomes excessively strong beyond the lower limit of the condition (8), large outward coma is produced. Further, in a case when extraordinary dispersion glass, for example, fluorite ($CaF_2$) or UD glass, is used to carry out correction of chromatic aberrations to a higher degree, the outward coma for the spectral g-line is increased. Therefore, the difficulty of correcting these aberrations in good balance is increased.

The range of condition (9) represents the refractive power of the second lens unit to maintain good stability of aberration correction throughout the focusing range. When the upper limit of the condition (9) is exceeded, as the refractive power is too weak, under-correction of spherical aberration results. Also, the total focusing movement of the second lens unit is increased. To compensate for this, the minimum object distance must be increased. For ensuring a space long enough to accommodate such an increased movement, the physical length of the entire lens system is caused to increase objectionably.

When the lower limit of the condition (9) is exceeded, as the refractive power becomes too strong, over-correction of spherical aberration results. Particularly for a close object, the over-correction becomes remarkably large. Also, the cemented surface of the doublet in the second lens unit no longer suffices for correcting chromatic aberrations (spherical aberration for the g-line and the variation of chromatic aberrations with focusing) in good balance. Particularly the flare for the g-line becomes difficult to correct well.

The range of condition (10) represents the refractive power of the concave front surface of the negative lens arranged at the frontmost position in the third lens unit, upon satisfaction of the conditions (8) and (9), to stabilize the aberrations which are corrected in good balance over the entire area of the picture frame. The on-axial light beam emerging from the first lens unit has spherical aberration inclined to a large under-correction. When focused to a shorter object distance, the second lens unit lies near the rear terminal end of movement to permit the on-axial light beam to pass through the second lens unit at a height near the optical axis. At the time of emergence from the second lens unit, therefore, the spherical aberration remains strongly under-corrected. Hence, if the divergence is weaker as exceeding the lower limit of the condition (10), the variation of the spherical aberration can no longer fully be corrected as focusing approaches the minimum object distance. Along with this, inward coma is produced, and distortion becomes under-corrected. When the upper limit of the condition (10) is exceeded, as the divergence becomes too much strong, the converse correction or over-correction of spherical aberration results, and the outward coma is increased. Also, the distortion starts to be over-corrected.

The range of condition (11) is to well correct the secondary spectrum for an excellent imaging performance. In the telephoto lens, for achieving a much-desired increase in the grade of imagery, it is of great importance to keep the secondary spectrum to a minimum. In the prior art, it has been the common practice to employ the positive and negative lenses of the front lens unit of positive power in correcting the second spectrum by choosing a proper combination of glasses therefor. Attempts have been made to do that correction in the rear lens unit. But its result could not be said to be good enough, because the chromatic aberrations were varied to a great extent.

Therefore, in the invention, by specifying the lens configuration as described herein before, and giving a proper range of the combination of glasses to be used in the negative and positive lenses of the cemented doublet of the third lens unit, there is realized a telephoto lens of increased aperture ratio. This lens still permits the secondary spectrum to be reduced to a very small magnitude at the maximum aperture and good stability of chromatic aberration correction to be maintained throughout the focusing range. That is, when the condition (11) is satisfied, it becomes possible to accomplish the objects started herein.

Next, the numerical data for the examples 9 to 11 of specific telephoto lenses of the invention are given in the following tables where Ri is the radius of curvature of the i-th lens surface counting from front; Di is the i-th axial thickness or air separation; Ni and $\nu i$ are the refractive index and Abbe number of the glass of the i-th lens, respectively. The values of the factors in the above-defined conditions for the examples 9 to 11 are listed in Table-3.

Figure 20A:
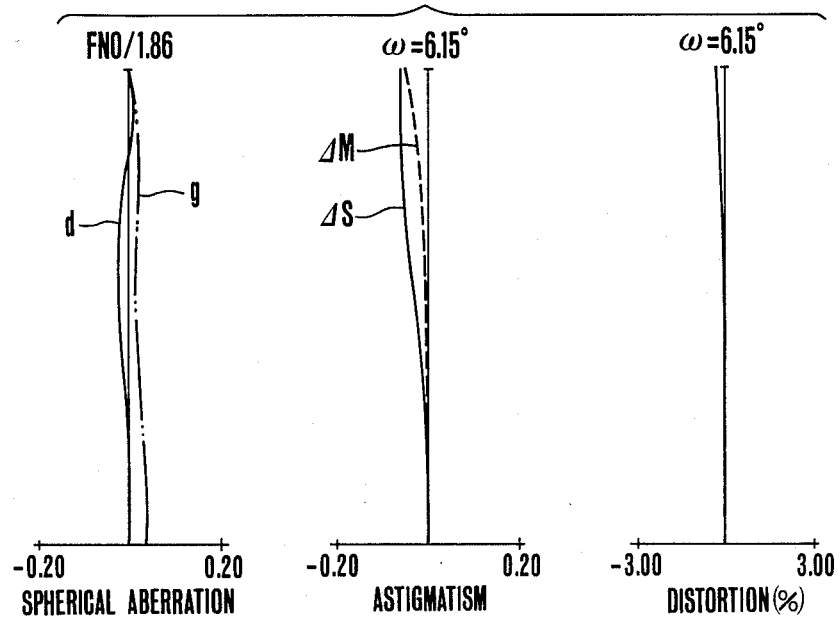
FIGS. 20(A), 20(B), 21(A), 21(B), 22(A), 22(B), 25(A), 25(B), and 26(A), 26(B) are graphic representations of the aberrations of the examples 9 to 13 respectively with FIGS. 20(A), 21(A), 22(A), 25(A) and 26(A) at an infinitely distance object, and FIGS. 20(B), 21(B), 22(B), 25(B) and 26(B) at a close object.
Figure 20B:
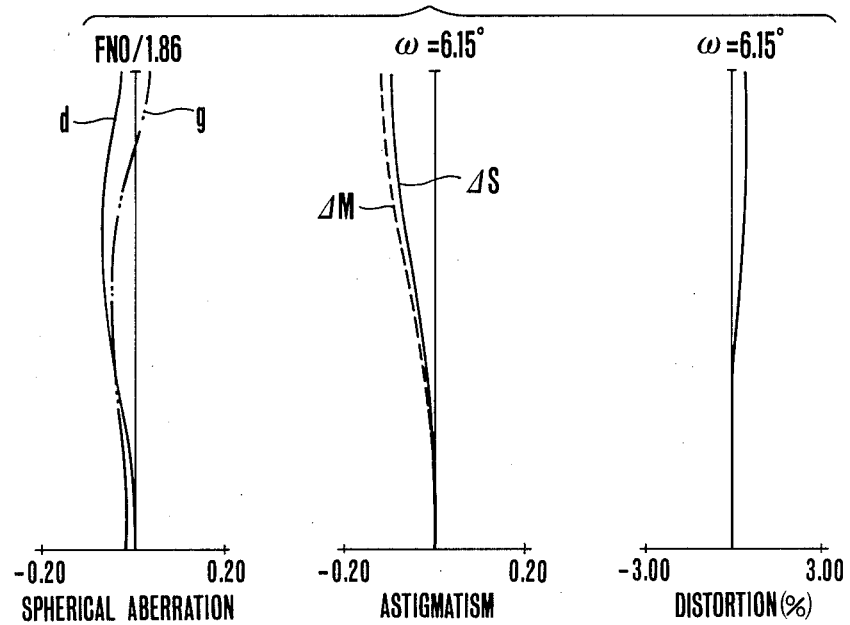

Numerical Example 9 (FIGS. 17, 20(A) and 20(B)):

| F = 200.00000 | FNo = 1:1.86 | 2ω = 12.3° | |
|---|---|---|---|
| R1 = 123.120 | D1 = 19.00 | N1 = 1.49700 | ν1 = 81.6 |
| R2 = −430.590 | D2 = 0.72 | | |
| R3 = 89.981 | D3 = 13.20 | N2 = 1.49700 | ν2 = 81.6 |
| R4 = 255.652 | D4 = 6.00 | | |
| R5 = −704.106 | D5 = 4.70 | N3 = 1.65412 | ν3 = 39.7 |
| R6 = 110.405 | D6 = 18.00 | | |
| R7 = 67.274 | D7 = 15.55 | N4 = 1.49700 | ν4 = 81.6 |
| R8 = 502.839 | D8 = 0.50 | | |
| R9 = 44.766 | D9 = 4.50 | N5 = 1.69680 | ν5 = 55.5 |
| R10 = 34.941 | D10 = Variable | | |
| R11 = −1069.676 | D11 = 6.00 | N6 = 1.84666 | ν6 = 23.9 |
| R12 = −106.363 | D12 = 2.50 | N7 = 1.61340 | ν7 = 43.8 |
| R13 = 57.199 | D13 = Variable | | |
| R14 = −35.135 | D14 = 4.40 | N8 = 1.65412 | ν8 = 39.7 |
| R15 = −475.931 | D15 = 8.49 | N9 = 1.65160 | ν9 = 58.6 |
| R16 = −42.493 | D16 = 0.15 | | |
| R17 = 96.893 | D17 = 5.50 | N10 = 1.61800 | ν10 = 63.4 |
| R18 = −241.315 | | | |

| | ∞ | 2.5m |
|---|---|---|
| D10 | 21.0 | 35.49 |
| D13 | 32.2 | 17.71 |

Figure 21A:
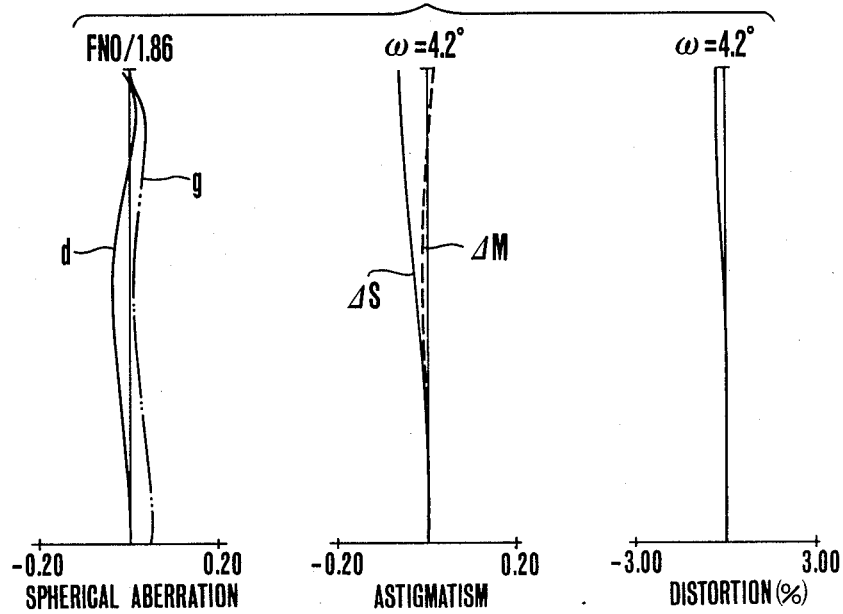
Figure 21B:
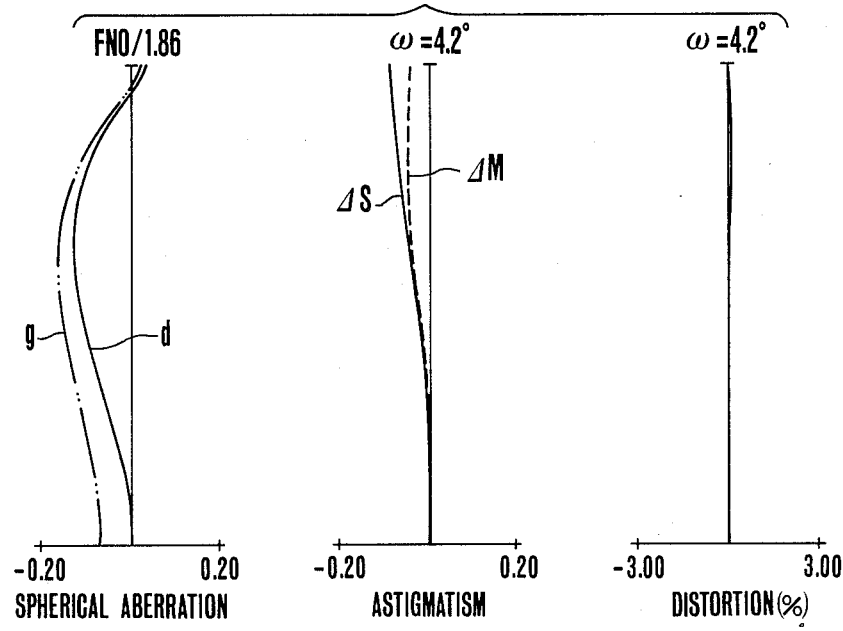

Numerical Example 10 (FIGS. 18, 21(A) and 21(B)):

| F = 295.00000 | FNo = 1:1.86 | 2ω = 8.4° | |
|---|---|---|---|
| R1 = 182.888 | D1 = 30.00 | N1 = 1.43387 | μ1 = 95.1 |
| R2 = −475.747 | D2 = 1.08 | | |
| R3 = 123.033 | D3 = 19.80 | N2 = 1.43387 | ν2 = 95.1 |
| R4 = 350.757 | D4 = 10.20 | | |
| R5 = −744.375 | D5 = 7.05 | N3 = 1.65412 | ν3 = 39.7 |
| R6 = 239.522 | D6 = 22.00 | | |
| R7 = 98.022 | D7 = 23.33 | N4 = 1.49700 | ν4 = 81.6 |
| R8 = 611.425 | D8 = 0.75 | | |
| R9 = 64.443 | D9 = 6.75 | N5 = 1.69680 | ν5 = 55.5 |
| R10 = 49.038 | D10 = Variable | | |
| R11 = 4164.527 | D11 = 9.00 | N6 = 1.84666 | ν6 = 23.9 |
| R12 = −184.043 | D12 = 3.75 | N7 = 1.61340 | ν7 = 43.8 |
| R13 = 73.948 | D13 = Variable | | |
| R14 = −47.659 | D14 = 6.60 | N8 = 1.65412 | ν8 = 39.7 |
| R15 = −223.545 | D15 = 12.74 | N9 = 1.61800 | ν9 = 63.4 |
| R16 = −56.561 | D16 = 0.23 | | |
| R17 = 124.338 | D17 = 8.25 | N10 = 1.61800 | ν10 = 63.4 |
| R18 = −388.653 | | | |

| | ∞ | 3.5m |
|---|---|---|
| D10 | 31.5 | 52.43 |

-continued

| F = 295.00000 | FNo = 1:1.86 | 2ω = 8.4° |
|---|---|---|
| D13 | 54.3 | 33.37 |

Figure 22A:
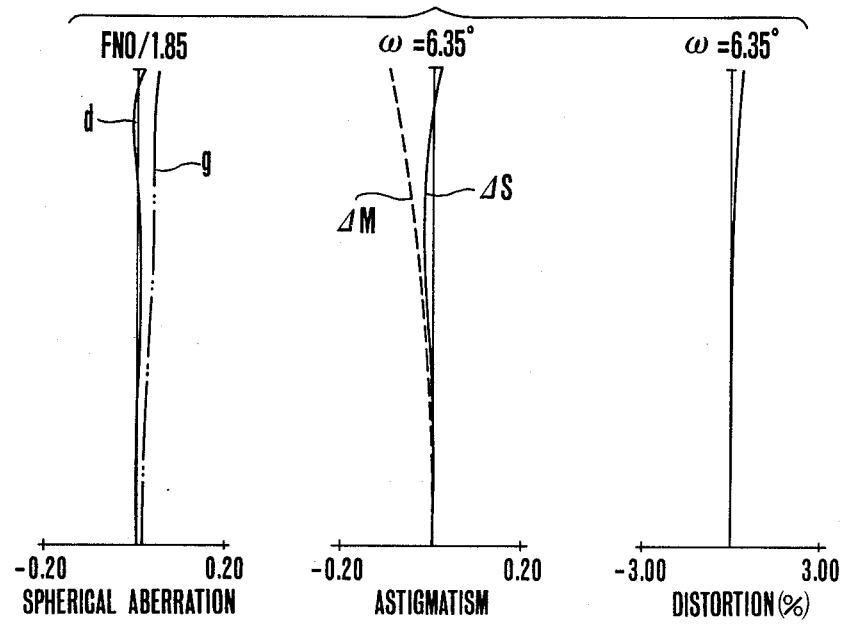
Figure 22B:
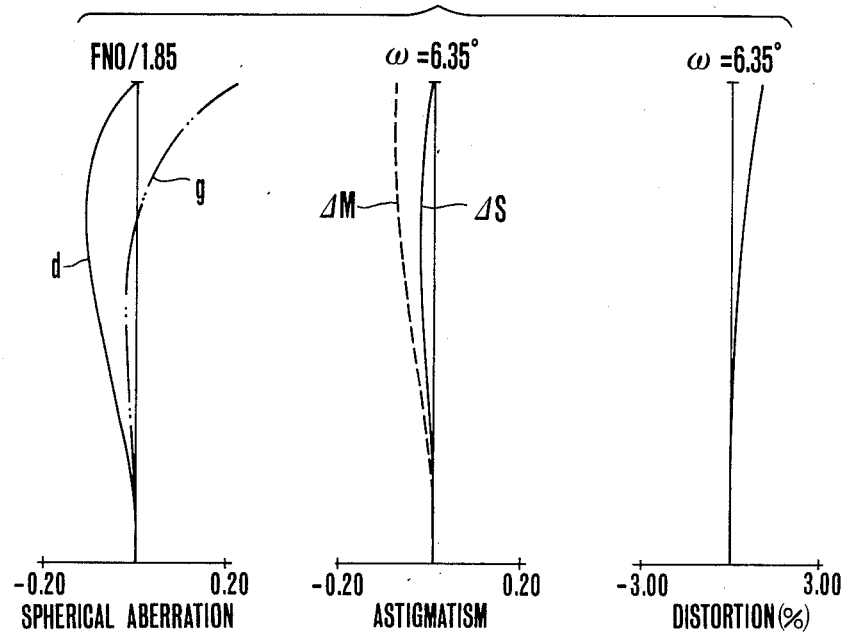

Numerical Example 11 (FIGS. 19, 22(A) and 22(B)):

| F = 195.00000 | FNo = 1:1.85 | 2ω = 12.7° | |
|---|---|---|---|
| R1 = 91.718 | D1 = 19.00 | N1 = 1.43387 | ν1 = 95.1 |
| R2 = 1218.268 | D2 = 0.30 | | |
| R3 = 100.774 | D3 = 14.00 | N2 = 1.43387 | ν2 = 95.1 |
| R4 = 1150.034 | D4 = 0.30 | | |
| R5 = 75.675 | D5 = 13.50 | N3 = 1.49700 | ν3 = 81.6 |
| R6 = 338.521 | D6 = 3.30 | | |
| R7 = 357356.937 | D7 = 5.00 | N4 = 1.72047 | ν4 = 34.7 |
| R8 = 95.447 | D8 = 6.54 | | |
| R9 = 40.983 | D9 = 5.00 | N5 = 1.55963 | ν5 = 61.2 |
| R10 = 32.549 | D10 = Variable | | |
| R11 = −603.482 | D11 = 7.00 | N6 = 1.80518 | ν6 = 25.4 |
| R12 = −91.341 | D12 = 3.00 | N7 = 1.61340 | ν7 = 43.8 |
| R13 = 54.868 | D13 = Variable | | |
| R14 = −38.686 | D14 = 2.50 | N8 = 1.57041 | ν8 = 48.1 |
| R15 = 1312.353 | D15 = 8.00 | N9 = 1.61800 | ν9 = 63.4 |
| R16 = −47.351 | D16 = 0.15 | | |
| R17 = 93.275 | D17 = 7.00 | N10 = 1.61800 | ν10 = 63.4 |
| R18 = −211.674 | | | |

| | ∞ | 2.5m |
|---|---|---|
| D10 | 18.0 | 31.18 |
| D13 | 33.66 | 20.48 |

TABLE-3

| | Numerical Example 9 | Numerical Example 10 | Numerical Example 11 |
|---|---|---|---|
| f | 200.0 | 295.0 | 195.0 |
| $f_1$ | 160.660060 | 229.425916 | 154.231902 |
| $f_2$ | −107.284380 | −147.297359 | −95.739185 |
| $\phi 3a$ | −0.0186172 | −0.0137251 | −0.0147447 |
| $\theta 3a$ | 1.271845 | 1.271845 | 1.260759 |
| $\theta 3b$ | 1.238095 | 1.240 | 1.240 |
| $\nu 3a$ | 39.70 | 39.70 | 48.10 |
| $\nu 3b$ | 58.60 | 63.40 | 63.40 |
| $f_1/f$ | 0.8033003 | 0.7624607 | 0.7909328 |
| $|f_2|/f$ | 0.5364219 | 0.4993131 | 0.4909702 |
| $|\phi 3a|f$ | 3.7234400 | 4.0489045 | 2.8752236 |
| $\dfrac{\theta 3a - \theta 3b}{\nu 3a - \nu 3b}$ | 0.0017857 | 0.0013437 | 0.0013568 |

Below, while taking in the background the before-described rear lens sub-unit which also serves as the supplementary lens for reducing the variation of aberration with focusing, another embodiment is described in which a better optical performance is obtained.

Figure 23:
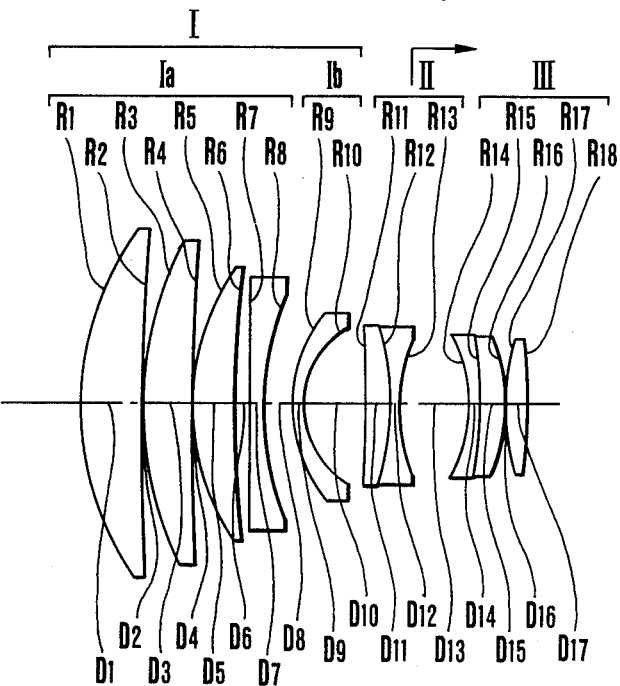
Figure 24:
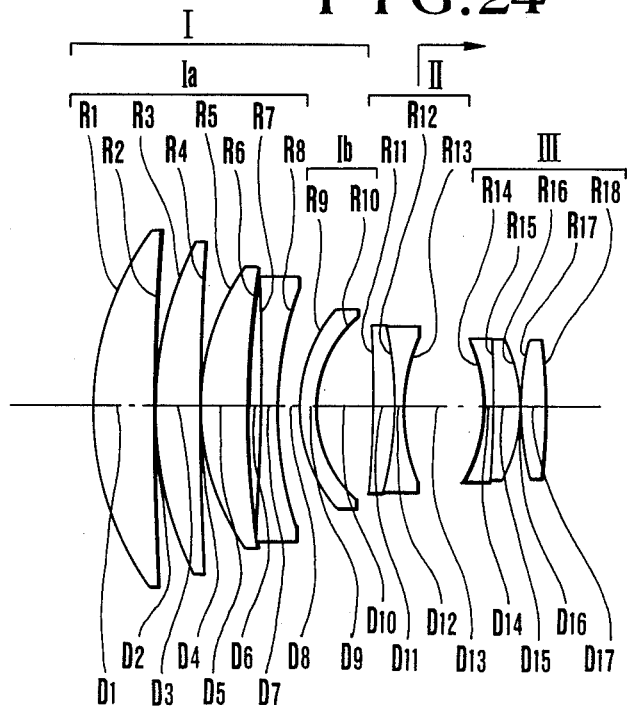

FIGS. 23 and 24 are longitudinal section views of numerical examples 12 and 13 of lenses. As has been described above, the lens comprises, from front to rear, a first lens unit I including a lens of negative power with the rear surface concave toward the rear and whose overall refractive power is positive, a second lens unit II of negative power axially movable for focusing, and a third lens unit III of positive power and including a negative lens whose front surface constitutes the frontmost surface concave toward the front. In the following, the first lens unit I is explained by dividing it to a front lens sub-unit Ia and a rear lens sub-unit Ib as the supplementary lens.

In this embodiment, letting the focal lengths of the entire system and all the lens units I (Ia, Ib), II and III be noted by F, fa, fb, $f_1$, $f_2$ and $f_3$ respectively, the following conditions are satisfied:

$$0.6f < fa < 0.85f \quad (12)$$

$$|f/fb| < 0.6 \quad (13)$$

$$0.45f < |f_2| < 0.7f \quad (14)$$

$$0.45f < f_3 < 0.7f \quad (15)$$

The range of condition (12) represent the positive refractive power of the front lens sub-unit Ia of the first lens unit I so as to shorten mainly the total length of the lens in such a manner that all aberrations are corrected in good balance over the entire area of the picture frame. When the upper limit of the condition (12) is exceeded, as the refractive power of the front lens sub-unit Ia is too weak, the diameter of the third lens and those that follow in the front lens sub-unit Ia are increased and the total length of the lens system is increased objectionably. When the lower limit of the condition (12) is exceeded, as the refractive power of the front lens sub-unit Ia is too strong, although the total length of the lens system is shortened, the aberration correction at the increased aperture ratio, particularly the under-correction of the meridional image surface and the over-correction of the distortion, becomes difficult to correct well.

Also, in the case when the front lens sub-unit Ia has such a configuration as has been described before, for too strong a refractive power of the front lens sub-unit Ia beyond the lower limit of the condition (12), large outward coma is produced. Further, when extraordinary dispersion glass, for example, fluorite ($CaF_2$) or UD glass in used in the front lens sub-unit Ia to correct chromatic aberrations for a higher grade imagery, large outward coma for the g-line is produced. It becomes difficult to correct these aberrations in good balance.

The range of condition (13) represents the negative refractive power of the rear lens sub-unit Ib to reduce the variation of aberrations to a smaller magnitude when focusing is performed by moving the second lens unit II.

When the condition (13) is violated, as the refractive power of the rear lens sub-unit Ib is too strong, the correcting effect by the rear lens sub-unit Ib when focusing, then becomes somewhat excessive. Hence when focused to a shorter object distance, outward coma is liable to be produced, and the meridional image surface is varied to a greater extent. Particularly for a close object, distortion becomes under-corrected.

The range of condition (14) represent the refractive power of the second lens unit II to well correct mainly the variation of aberrations when focusing is performed by moving the second lens unit II. When the upper limit of the condition (14) is exceeded, as the refractive power is too weak, under-correction of spherical aberration results. Also, the total focusing movement of the second lens unit II is increased. As a result, the minimum object distance is increased, and, because the moving space must be sufficiently ensured, the total length of the lens system is elongated objectionably.

When the lower limit of the condition (14) is exceeded, as the refractive power is too strong, over-correction of spherical aberration results. Particularly for a close object, distortion becomes very over-corrected. Also, it becomes difficult to correct chromatic aberrations (spherical aberration for the g-line and the variation of chromatic aberration with focusing) in good balance by the cemented surface of the doublet in the second lens unit II. Particularly the flare for the g-line becomes difficult to well correct.

The range of condition (15) represent the refractive power of the third lens unit mainly to correct the various aberrations in good balance over the entire area of the picture frame while achieving a shortening of the total length of the entire lens system.

When the upper limit of the condition (15) is exceeded, as the refractive power is too weak, outward coma is increased, and distortion becomes over-corrected.

When the lower limit of the condition (15) is exceeded, as the refractive power is too strong, the positive refractive power is so much maldistributed towards the image side that the effort to increase the telephoto ratio of the entire system is weakened. Therefore, the total length of the entire system is increased and that increases the difficulty of correcting chromatic aberrations with a high efficiency by using extraordinary dispersion glass in the front lens sub-unit Ia with a fewer number of lens elements.

It should be noted that, in the invention, to achieve a further improvement of the optical performance over the entire area of the picture frame, the third lens unit is preferably constructed from three lenses, or negative and positive lenses cemented together and a positive lens, the cemented lens being in the meniscus form convex toward the rear. By this, good correction of, for example, spherical aberration and off-axial coma, is made easy by the front concave surface of the cemented lens.

Also, the positive lens of the image side may be comprised of two or more positive lens elements. Further, the cemented lens may be in broken contact. In either case, high grade optical performance can be obtained.

Though in this embodiment, there has been shown the case of the second lens unit constructed only from the cemented lens, a negative singlet and/or a cemented doublet may be added thereto. Accordingly, a higher degree of aberration correction, particularly the variation of aberrations with focusing, can be corrected well.

In this embodiment, the extraordinary dispersion glass used is made of fluorite in the first lens counting from front of the front lens sub-unit to well correct chromatic aberrations. Fluorite lenses generally have weak physical strengths. On this account, this first lens of fluorite is preferably protected by a glass plate at the front. Also, this protection glass plate may be imparted with a curvature. Since this makes easier aberration correction, it is desirable to do so. It should be noted that all the specific examples described above each satisfy all the numerical conditions (1), (2), (3) and (4).

The numerical data for the specific examples 12 and 13 are shown in the following tables in which Ri is the radius of curvature of the i-th lens surface counting from front; Di is the i-th axial thickness or air separation; and Ni and $\nu i$ are the refractive index and Abbe number of the glass of the i-th lens, respectively.

While in the foregoing embodiments, the front lens of the third lens unit has been constructed from a cemented lens of negative and positive elements, the invention is not confined thereto. It may otherwise be constructed in the form of singlets, provided that use is made of a negative lens whose front surface is of strong concave curvature toward the front and at least two positive lenses. Even in this case, nothing disadvantageous is found at all. Also, for an even higher degree of aberration correction, each of these two positive lenses is preferably constructed in a cemented doublet with a negative lens.

Figure 25A:
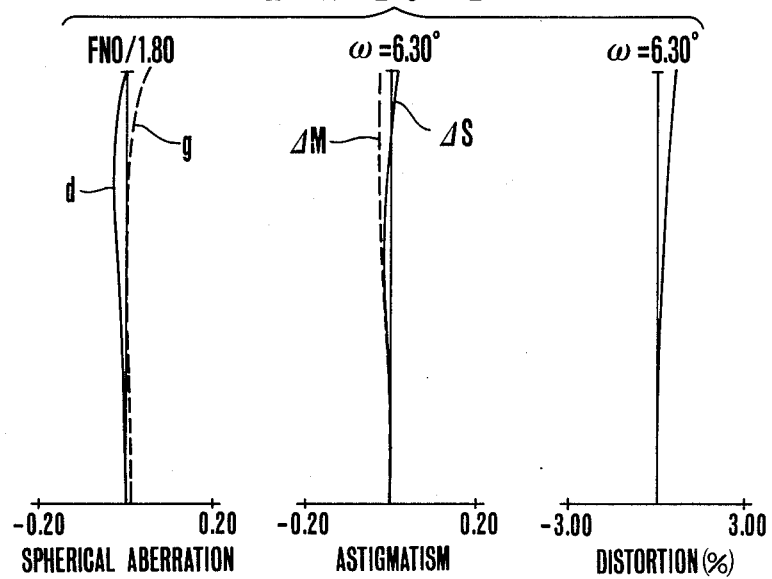
Figure 25B:
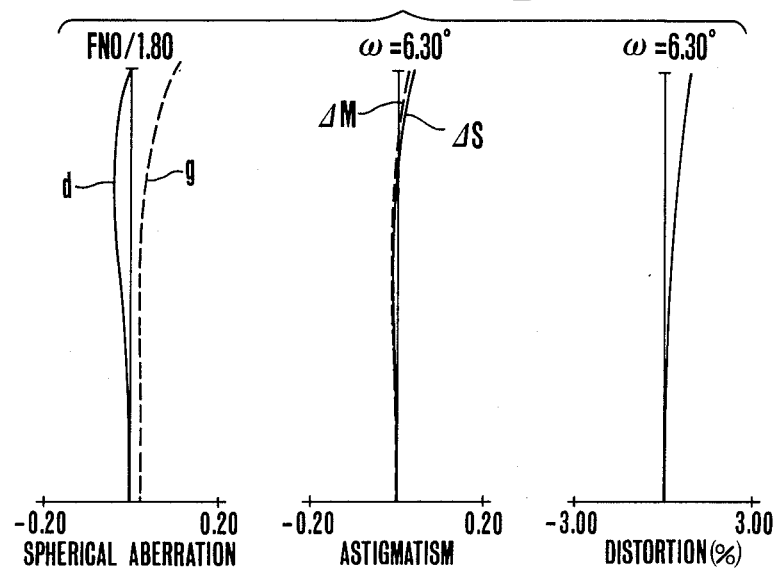

Numerical Example 12 (FIGS. 23, 25(A) and 25(B)):

| F = 195 FNo = 1:1.85 2ω = 12.7° | | | |
|---|---|---|---|
| R1 = 91.94 | D1 = 19.00 | N1 = 1.43387 | ν1 = 95.1 |
| R2 = 1406.93 | D2 = 0.30 | | |
| R3 = 111.54 | D3 = 14.50 | N2 = 1.43387 | ν2 = 95.1 |
| R4 = 1004.00 | D4 = 0.30 | | |
| R5 = 77.52 | D5 = 13.50 | N3 = 1.49700 | ν3 = 81.6 |
| R6 = 332.80 | D6 = 3.70 | | |
| R7 = −19575.79 | D7 = 5.00 | N4 = 1.72047 | ν4 = 34.7 |
| R8 = 92.31 | D8 = 8.00 | | |
| R9 = 40.81 | D9 = 5.00 | N5 = 1.58913 | ν5 = 61.0 |
| R10 = 33.46 | D10 = 18.00 | | |
| R11 = −295.83 | D11 = 7.00 | N6 = 1.80518 | ν6 = 25.4 |
| R12 = −92.21 | D12 = 3.00 | N7 = 1.52682 | ν7 = 51.1 |
| R13 = 55.91 | D13 = 22.70 | | |
| R14 = −41.37 | D14 = 2.50 | N8 = 1.59551 | ν8 = 39.2 |
| R15 = −122.18 | D15 = 8.00 | N9 = 1.61800 | ν9 = 63.4 |
| R16 = −51.25 | D16 = 0.15 | | |
| R17 = 108.53 | D17 = 7.00 | N10 = 1.61800 | ν10 = 63.4 |
| R18 = −152.01 | | | |

Figure 26A:
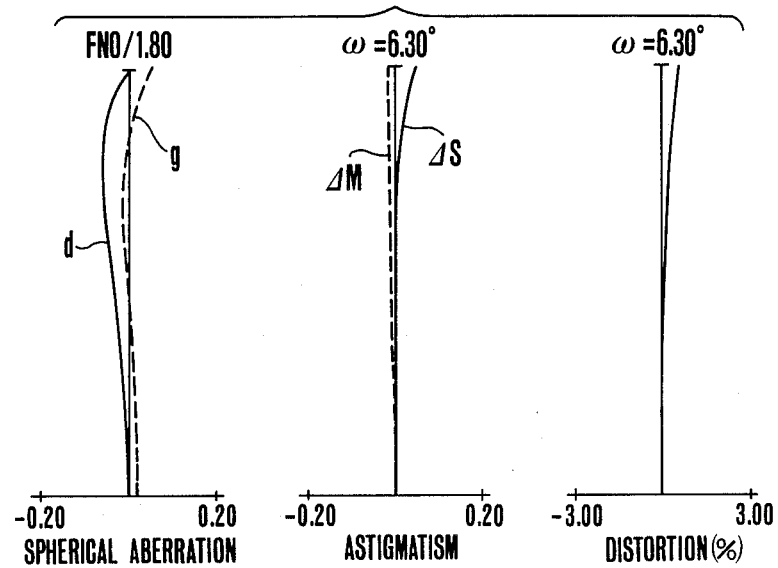
Figure 26B:
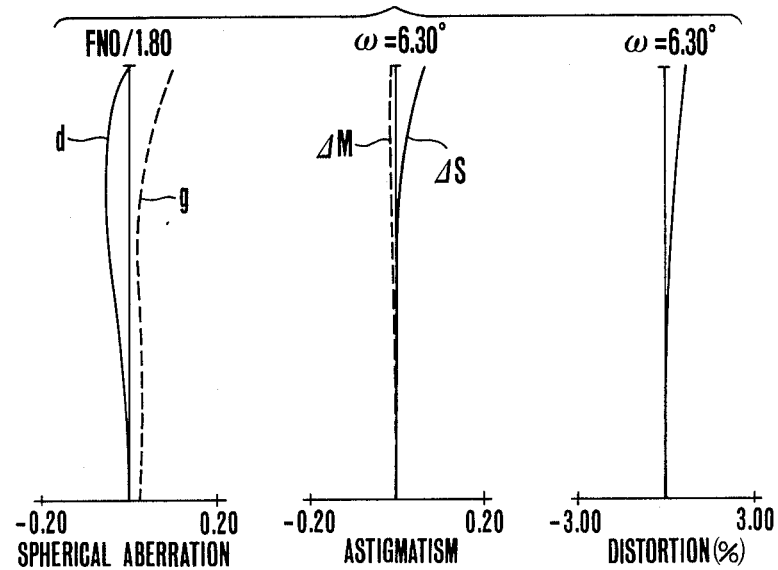

Numerical Example 13 (FIGS. 24, 26(A) and 26(B)):

| F = 195 FNo = 1:1.85 2ω = 12.7° | | | |
|---|---|---|---|
| R1 = 91.47 | D1 = 19.00 | N1 = 1.43387 | ν1 = 95.1 |
| R2 = 1341.81 | D2 = 0.30 | | |
| R3 = 112.65 | D3 = 14.00 | N2 = 1.43387 | ν2 = 95.1 |
| R4 = 1069.51 | D4 = 0.30 | | |
| R5 = 76.05 | D5 = 13.50 | N3 = 1.49700 | ν3 = 81.6 |
| R6 = 336.53 | D6 = 3.30 | | |
| R7 = 21408.78 | D7 = 5.00 | N4 = 1.72047 | ν4 = 34.7 |
| R8 = 97.23 | D8 = 7.00 | | |
| R9 = 41.56 | D9 = 5.00 | N5 = 1.55963 | ν5 = 61.2 |
| R10 = 33.47 | D10 = 18.00 | | |
| R11 = −688.87 | D11 = 7.00 | N6 = 1.80518 | ν6 = 25.4 |
| R12 = −96.14 | D12 = 3.00 | N7 = 1.61340 | ν7 = 43.8 |
| R13 = 58.80 | D13 = 24.70 | | |
| R14 = −38.22 | D14 = 2.50 | N8 = 1.57041 | ν8 = 48.1 |
| R15 = −572.13 | D15 = 8.00 | N9 = 1.61800 | ν9 = 63.4 |
| R16 = −46.35 | D16 = 0.15 | | |
| R17 = 111.62 | D17 = 7.00 | N10 = 1.61800 | ν10 = 63.4 |
| R18 = −194.22 | | | |

Accordingly to the present invention, the form and construction and arrangement of the constituent lenses are specified as has been described above. Therefore, it is possible to achieve realization of a telephoto lens of increased aperture ratio with a short total length and high grade optical performance.

Also, even when focusing is performed by moving the second lens unit, or the rear-focus method is employed, a high-aperture telephoto lens in which the range of variation of aberrations with focusing is reduced to a negligible magnitude can be realized.

What is claimed is:

1. A photographic lens comprising, from front to rear,
    a first lens unit of positive overall refractive power having a lens of negative refractive power whose rear surface is concave toward the rear;
    a second lens unit of negative refractive power axially movable for focusing; and
    a third lens unit of positive overall refractive power having a negative lens whose front-most lens surface is concave toward the front and having at least two positive lenses in that order from front.

2. A photographic lens according to claim 1, satisfying the following condition:

$$1.0 < (1/f)(R1A/(N1A-1) - R3A/(N3A-1) + |f2-f|) < 3.0$$

where R1A and R3A are the radii of curvature of said concave surfaces of said first and said third lens units respectively; N1A and N3A are the refractive indices of said negative lenses of said first and said third lens units, respectively; and f2 and f are the focal lengths of said second lens unit and the entire lens system, respectively.

3. A photographic lens according to claim 1 or 2, satisfying the following condition:

$$0.45 < |f2/f| < 1.4$$

4. A photographic lens according to claim 3, satisfying the following conditions:

$$0.7 < f1/f < 1.5$$

$$0.4 < f3/f < 0.8$$

where f1 and f3 are the focal lengths of said first and said third lens units, respectively.

5. A photographic lens according to claim 4, satisfying the following conditions:

$$0.4 < e12/e23 < 1.7$$

where e12 and e23 are the intervals between the principal points of said first and second lens units and between the principal points of said second and third lens units, respectively.

6. A photographic lens according to claim 1, wherein said second lens unit includes one positive lens and at least one negative lens.

7. A photographic lens according to claim 6, wherein said positive and said negative lenses are formed to a cemented lens.

8. A photographic lens according to claim 6, wherein said second lens unit includes a meniscus-shaped positive lens to rearward convexity and a bi-concave negative lens, satisfying the following conditions:

$$0.1 < N2A - N2B$$

$$10 < \nu 2B - \nu 2A$$

where N2A and N2B are the refractive indices of the materials of said positive and said negative lenses, respectively; and ν2A and ν2B are the Abbe numbers of the materials of said positive and said negative lenses, respectively.

9. A photographic lens according to claim 1 or 2, wherein said first lens unit has a rear lens sub-unit of meniscus form convex toward front at the rear-most position.

10. A photographic lens according to claim 9, satisfying the following conditions:

$$0.7 < f1/f < 0.85$$

$$0.45 < |f2|/f < 0.6$$

$$2.5 < |\phi_{3a}| \cdot f < 4.5$$

where f is the focal length of the entire lens system; f1 and f2 are the focal lengths of said first and said second lens units, respectively; and $\phi_{3a}$ is the refractive power of the front-most lens surface in said third lens unit.

11. A photographic lens according to claim 10, wherein said third lens unit includes at the front-most position a cemented lens having a negative lens whose front surface is of strong concave curvature toward front and a positive lens, satisfying the following condition:

$|(\theta_{3a}-\theta_{3b})/(\nu_{3a}-\nu_{3b})| < 0.002$ where $\theta_{3a}$ and $\nu_{3a}$ are the partial dispersion ratio and Abbe number of said negative lens in the cemented lens of said third lens unit, respectively; and $\theta_{3b}$ and $\nu_{3b}$ are the partial dispersion ratio and Abbe number of said positive lens in the cemented lens of said third lens unit, respectively.

12. A photographic lens according to claim 9, satisfying the following conditions:

$0.6f < fa < 0.85f$ $|f/fb| < 0.6$ $0.45f < |f2| < 0.7f$ $0.45f < f3 < 0.7f$ where fa and fb are the focal lengths of a front lens sub-unit and said rear lens sub-unit in said first lens unit; f2 and f3 are the focal lengths of said second and third lens units, respectively; and f is the focal length of the entire lens system.

13. A photographic lens according to claim 1, satisfying the following condition:

$0.6 < |RII/(NII-1)|/|RIII/(NIII-1)| 4$ where RII is a radius curvature of a lens surface having the strongest negative refractive power in said second lens unit, NII is a refractive index of a glass having the lens surface of the radius of curvature RII, RIII is a radius of curvature of the front-most lens surface in said third lens unit, and NIII is a refractive index of a glass having the lens surface of the radius of curvature RIII.

14. A photographic lens comprising, from front to rear,
(a) a first lens unit of positive refractive power, said first lens unit including a front lens sub-unit having three positive lenses and one negative lens whose rear surface is concave toward the rear, and a rear lens sub-unit having a meniscus-shaped lens convex toward the front;
(b) a second lens unit having a negative refractive power and axially movable for focusing; and
(c) a third lens unit including a negative lens whose front-most lens surface is concave toward the front and having a positive power as a whole.

15. A photographic lens according to claim 14, wherein said front lens sub-unit comprises, from front to rear, a positive lens, a positive lens, a positive lens and said negative lens.

16. A photographic lens according to claim 14, wherein said front lens sub-unit comprises, from front to rear, a positive lens, a positive lens, said negative lens, and a positive lens.

17. A photographic lens according to claim 15, satisfying the following conditions:

$0.7 < f1/f < 0.85$ $0.45 < |f2|/f < 0.6$ $2.5 < |\phi_{3a}| \cdot f < 4.5$ where f is the focal length of the entire lens system; f1 and f2 are the focal lengths of said first and said second lens units, respectively; and $\phi_{3a}$ is the refractive power of the front-most lens surface in said third lens unit.

18. A photographic lens according to claim 15, wherein said third lens unit includes a cemented lens having said negative lens and a positive lens cemented together, satisfying the following condition:

$|(\theta_{3a}-\theta_{3b})/(\nu_{3a}-\nu_{3b})| < 0.002$ where $\theta_{3a}$ and $\nu_{3a}$ are the partial dispersion ratio and Abbe number of said negative lens in the cemented lens of said third lens unit, respectively; and $\theta_{3b}$ and $\nu_{3b}$ are the partial dispersion ratio and Abbe number of said positive lens in the cemented lens of said third lens unit, respectively.

19. A photographic lens according to claim satisfying the following conditions:

$0.6f < fa < 0.85f$ $|f/fb| < 0.6$ $0.45f < |f2| < 0.7f$ $0.45f < f3 \leq 0.7f$ where fa and fb are the focal lengths of said front and said rear lens sub-units, respectively; f2 and f3 are the focal lengths of said second and third lens units, respectively; and f is the focal length of the entire lens system.

20. A photographic lens according to claim 14, satisfying the following condition:

$1.0 < (1/f)(R1A/(N1A-1) - R3A/(N3A-1) + |f2-|) < 3.0$ where R1A and R3A are the radii of curvature of said concave surfaces of said front lens sub-unit and said third lens unit, respectively; N1A and N3A are the refractive indices of said negative lens of said front lens sub-unit and said negative lens of said third lens unit, respectively; and f2 and f are the focal lengths of said second lens unit and the entire lens system, respectively.

21. A photographic lens according to claim 13, satisfying the following condition:

$0.6 < |RII/(NII-1)|/|RIII/(NIII-1)| < 4$ where RII is a radius curvature of a lens surface having the strongest negative refractive power in said second lens unit, NII is a refractive index of a glass having the lens surface of the radius of curvature RII, RIII is a radius of curvature of the front-most lens surface in said third lens unit, and NIII is a refractive index of a glass having the lens surface of the radius of curvature RIII.

* * * * *

UNITED STATES PATENT AND TRADEMARK OFFICE
CERTIFICATE OF CORRECTION

PATENT NO. : 4,852,984

DATED : August 1, 1989

INVENTOR(S) : SADATOSHI TAKAHASHI, ET AL.

It is certified that error appears in the above-identified patent and that said Letters Patent is hereby corrected as shown below:

ON TITLE PAGE:

At [75] Inventor: "Hiroshi Endo, Kanagawa, " should read --Hiroshi Endo, Yokohama,--.

At [57] ABSTRACT, line 7, "front-most" should read --frontmost--.

At column 1, line 37, "example" should read --example,--.

At column 2, line 40, "lessening of" should read --lessening--.

At column 3, line 44, "or" should be deleted; and

At column 3, line 64, "the" should be deleted.

At column 4, line 20, "focusing" should read --a focusing--;

UNITED STATES PATENT AND TRADEMARK OFFICE
CERTIFICATE OF CORRECTION

PATENT NO. : 4,852,984

DATED : August 1, 1989

INVENTOR(S) : SADATOSHI TAKAHASHI, ET AL.

It is certified that error appears in the above-identified patent and that said Letters Patent is hereby corrected as shown below:

At column 4, line 45, "second unit," should read --second lens unit--.

At column 5, line 51, "imagery" should read --image--.

At column 7, line 15, "$BH^4CH^6$" should read --$BH^4+CH^6$--.

At column 10, Numerical Example 5, "FNo=1:14" should read --FNo=1:1.4--; and

At column 10, Numerical Example 6, "$B=7.11165 \times 10^{-12}$" should read --$C=7.11165 \times 10^{-12}$--.

At column 12, line 14, "more full" should read --fuller--; and

At column 12, line 26, "examples 9 to 10," should read --examples 9 and 10--.

At column 14, line 50, "much" should be deleted;

UNITED STATES PATENT AND TRADEMARK OFFICE
CERTIFICATE OF CORRECTION

PATENT NO. : 4,852,984
DATED : August 1, 1989
INVENTOR(S) : SADATOSHI TAKAHASHI, ET AL.

It is certified that error appears in the above-identified patent and that said Letters Patent is hereby corrected as shown below:

At column 14, line 57, "imagery," should read --image,--;

At column 14, line 61, "second" should read --secondary--; and

At column 14, line 68, "herein before," should read --hereinbefore--.

At column 16, line 64 "to" should read --into--.

At column 17, line 1, "F," should read --f,--;

At column 17, line 11, "represent" should read --represents--;

At column 17, line 35, "in used" should read --is used--;

At column 17, line 36, "imagery," should read --image,--;

UNITED STATES PATENT AND TRADEMARK OFFICE
CERTIFICATE OF CORRECTION

PATENT NO. : 4,852,984

DATED : August 1, 1989

INVENTOR(S) : SADATOSHI TAKAHASHI, ET AL.

It is certified that error appears in the above-identified patent and that said Letters Patent is hereby corrected as shown below:

At column 17, line 46, "rear lens sub-unit Ib" should read --rear lens sub-unit Ib,--;

At column 17, line 47, "Hence" should read --Hence,--; and

At column 17, line 52, "represent" should read --represents--.

At column 18, line 5, "represent" should read --represents--; and

At column 18, line 22, "fewer" should read --smaller--.

At column 19, line 48, "Accordingly" should read --According--.

Column 19, line 68;
At Claim 1, line 9, "front-most" should read --frontmost--; and Column 20, line 2;
At Claim 1, line 11, "front." should read --the front.--.

UNITED STATES PATENT AND TRADEMARK OFFICE
CERTIFICATE OF CORRECTION

PATENT NO. : 4,852,984

DATED : August 1, 1989

INVENTOR(S) : SADATOSHI TAKAHASHI, ET AL.

It is certified that error appears in the above-identified patent and that said Letters Patent is hereby corrected as shown below:

Column 20, line 59;
    At Claim 9, line 3, "rear-most" should read

--rearmost--.

Column 21, line 4;
    At Claim 10, line 9, "front-most" should read

--frontmost--.

Column 21, line 6;
    At Claim 11, line 2, "front-most" should read

--frontmost--.

Column 21, line 38;
    At Claim 13, line 3, "0.6<|RII/(NII-1)|/RIII/(NIII-1)|4"

should read --0.6<|RII/(NII-1)|/RIII/(NIII-1)|<4--; and

Column 21, line 45;
    At Claim 13, line 8, "front-most" should read

--frontmost--.

Column 21, line 59;
    At Claim 14, line 12, "front-most" should read

--frontmost--.

UNITED STATES PATENT AND TRADEMARK OFFICE
CERTIFICATE OF CORRECTION

PATENT NO. : 4,852,984

DATED : August 1, 1989

INVENTOR(S) : SADATOSHI TAKAHASHI, ET AL.

It is certified that error appears in the above-identified patent and that said Letters Patent is hereby corrected as shown below:

Column 22, line 13;
    At Claim 17, line 9, "front-most" should read --frontmost--.

Column 22, line 27;
    At Claim 19, line 1, "claim satisfying" should read --claim 16, satisfying--; and Column 22, line 36;
    At Claim 19, line 6, "$0.45f<f3\leq0.7f$" should read --$0.45f<f3<0.7f$--.

Column 22 line 63;
    At Claim 21, line 8, "front-most" should read --frontmost--.

Signed and Sealed this

Twenty-fifth Day of February, 1992

Attest:

HARRY F. MANBECK, JR.

Attesting Officer      Commissioner of Patents and Trademarks